US012013557B1

(12) United States Patent
Mach et al.

(10) Patent No.: US 12,013,557 B1
(45) Date of Patent: Jun. 18, 2024

(54) PHASE-SHIFTED, CHIRPED VOLUME BRAGG GRATINGS

(71) Applicant: University of Central Florida Research Foundation, Inc., Orlando, FL (US)

(72) Inventors: Lam Mach, Orlando, FL (US); Ivan Divliansky, Orlando, FL (US); Leonid Glebov, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 18/196,324

(22) Filed: May 11, 2023

Related U.S. Application Data

(60) Provisional application No. 63/340,781, filed on May 11, 2022.

(51) Int. Cl.
 *G02B 5/32* (2006.01)
 *G02B 5/18* (2006.01)
 *G03H 1/02* (2006.01)
 *G03H 1/04* (2006.01)
(52) U.S. Cl.
 CPC ............................. *G02B 5/1861* (2013.01)
(58) Field of Classification Search
 CPC .................................................. G02B 5/1861
 USPC ............................................................. 359/573
 See application file for complete search history.

(56) References Cited

U.S. PATENT DOCUMENTS

2016/0116656 A1   4/2016  Glebov et al.

OTHER PUBLICATIONS

Glebov, Leonid, et al. "Volume-chirped Bragg Gratings: Monolithic Components for Stretching and Compression of Ultrashort Laser Pulses." SPIE., by [CREOL] and Optigrate Corp, Feb. 2014, www.spiedigitallibrary.org/journals/optical-enginee (Year: 2014).*
Igor V. Ciapurin, et al., "Modeling of phase volume diffractive gratings, part 1: transmitting sinusoidal uniform gratings," Optical Engineering 45 (2006) 015802, 1-9.
Igor V. Ciapurin, et al., "Modeling of phase volume diffractive gratings, part 2: reflecting sinusoidal uniform gratings, Bragg mirrors," Optical Engineering 51 (2012) 058001, 1-10.

* cited by examiner

*Primary Examiner* — Joseph P Martinez
*Assistant Examiner* — Grant A Gagnon
(74) *Attorney, Agent, or Firm* — Suiter Swantz IP

(57) ABSTRACT

A phase-shifted longitudinally-chirped volume Bragg grating (PS-LCVBG) may be formed as a solid block of photosensitive material having a planar input face, where the photosensitive material includes a VBG formed as a periodic volumetric refractive index distribution characterized by a grating vector direction. A period of the VBG may be longitudinally chirped to vary linearly along the grating vector direction. The VBG may further include a spatially-varying distribution of longitudinal phase shifts providing a spatially-varying distribution of reflectivity in a transverse plane normal to the grating vector direction, where light incident on the planar input face is at least partially reflected based on the spatially-varying distribution of reflectivity.

24 Claims, 17 Drawing Sheets

PHASE-SHIFTED, CHIRPED VOLUME BRAGG GRATINGS

CROSS-REFERENCE TO RELATED APPLICATION

The present application claims the benefit under 35 U.S.C. § 119(e) of U.S. Provisional Application Ser. No. 63/340,781, filed May 11, 2022, entitled PHASE-SHIFTED, CHIRPED VOLUME BRAGG GRATINGS, naming Lam Mach, Ivan Divlianski, and Leonid Glebov as inventors, which is incorporated herein by reference in the entirety.

TECHNICAL FIELD

The present disclosure relates generally to volume Bragg gratings (VBGs) and, more particularly, to phase-shifted longitudinally chirped VBGs.

BACKGROUND

Traditional volume Bragg gratings (VBGs) are formed as a refractive index modulation within the volume of a material along a single grating vector direction. However, it may be desirable to provide more complex diffractive structures while taking advantage of the three-dimensional platform provided by volume gratings.

SUMMARY

A phase-shifted longitudinally-chirped volume Bragg grating (PS-LCVBG) is disclosed in accordance with one or more illustrative embodiments of the present disclosure. In one illustrative embodiment, the PS-LCVBG includes a solid block of photosensitive material having a planar input face, where the photosensitive material includes a VBG formed as a periodic volumetric refractive index distribution characterized by a grating vector direction. In another illustrative embodiment, a period of the VBG is longitudinally chirped to vary linearly along the grating vector direction. In another illustrative embodiment, the VBG further includes a spatially-varying distribution of longitudinal phase shifts providing a spatially-varying distribution of reflectivity in a transverse plane normal to the grating vector direction, wherein light incident on the planar input face is at least partially reflected based on the spatially-varying distribution of reflectivity.

An emission source is disclosed in accordance with one or more illustrative embodiments of the present disclosure. In one illustrative embodiment, the emission source includes a PS-LCVBG formed as a solid block of photo-luminescent photosensitive material having two parallel planar faces, where the photo-luminescent photosensitive material includes a VBG formed as a periodic volumetric refractive index distribution characterized by a grating vector direction. In another illustrative embodiment, the grating vector direction is normal to the planar faces. In another illustrative embodiment, a period of the VBG is longitudinally chirped to vary linearly along the grating vector direction. In another illustrative embodiment, the VBG further includes a spatially-varying distribution of longitudinal phase shifts providing a spatially-varying distribution of reflectivity in a transverse plane normal to the grating vector direction, where the spatially-varying distribution of the reflectivity in a transverse plane includes one or more reflectivity notches with tunable center wavelengths as a function of position in the transverse plane. In another illustrative embodiment, the emission source further includes a pump source configured to generate pump light. In another illustrative embodiment, the emission source further includes one or more input lenses configured to direct the pump light into the PS-LCVBG, wherein the PS-LCVBG emits coherent light at the center wavelengths, wherein the center wavelengths are tunable by adjusting a relative position of the pump light within the transverse plane.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

DETAILED DESCRIPTION

Figure 1A:
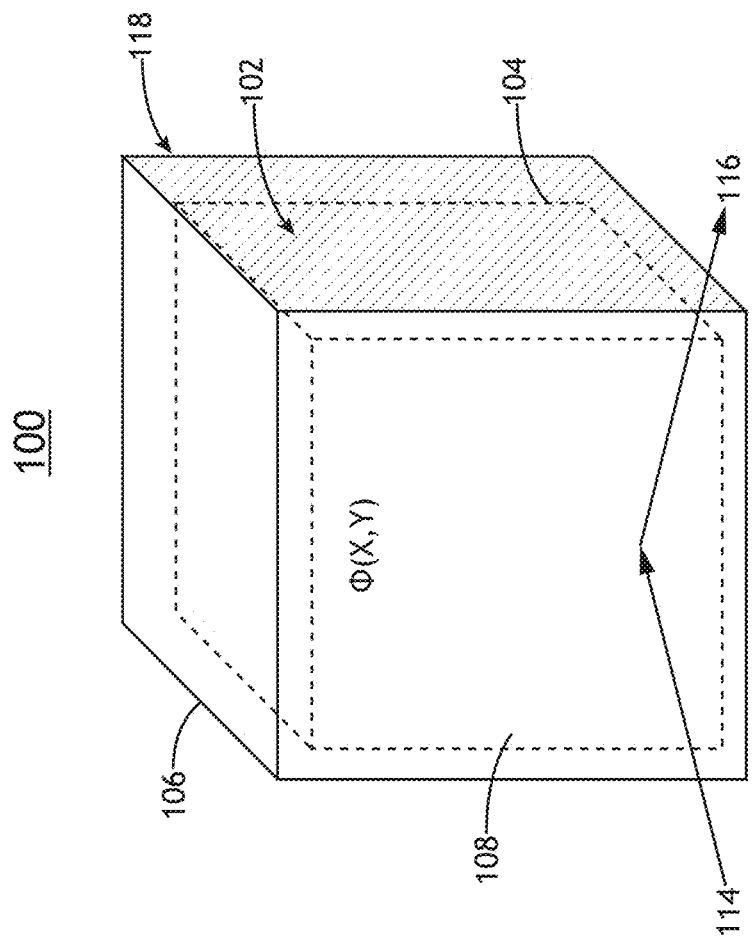
FIG. 1A is a perspective view of the phase transformation device, in accordance with one or more embodiments of the present disclosure.
Figure 1A:
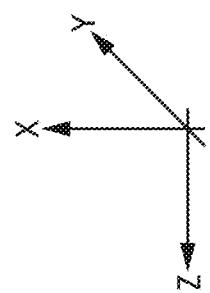

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods providing phase-shifted longitudinally-chirped volume Bragg gratings (PS-LCVBGs).

VBGs are generally described in Igor V. Ciapurin, et al., "Modeling of phase volume diffractive gratings, part 1: transmitting sinusoidal uniform gratings," Optical Engineering 45 (2006) 015802, 1-9; and Igor V. Ciapurin, et al., "Modeling of phase volume diffractive gratings, part 2: reflecting sinusoidal uniform gratings, Bragg mirrors," Optical Engineering 51 (2012) 058001, 1-10, both of which are incorporated herein by reference in their entireties. Further, transmissive VBGs (e.g., VBGs for which light satisfying a Bragg condition is diffracted as a transmitted beam) configured as transmissive phase masks are described generally in U.S. Patent Publication No. 2016/0116656 published on Apr. 28, 2016, which is incorporated herein by reference in its entirety.

A PC-LCVBG may include a VBG formed as a periodic volumetric refractive index distribution within a photosensitive medium having at least one planar face suitable for interaction with incident light. More particularly, a PS-LCVBG may be characterized by a periodic refractive index variation along a grating direction (e.g., a grating vector direction), where the grating period is longitudinally chirped along the grating vector direction. In this way, the period of the grating may continually change (e.g., increase or decrease) along the grating direction. A PS-LCVBG may further provide a spatially-varying distribution of longitudinal phase shifts, which may be characterized in a transverse plane normal to the grating direction. In this way, the PS-LCVBG may provide a spatially-varying distribution of reflectivity in the transverse plane.

Put another way, a PS-LCVBG may be characterized as an aperiodic VBG in which the Bragg period may arbitrarily vary in multiple dimensions: longitudinally along the grating direction and also in a transverse plane. In this way, a PS-LCVBG may possess a distinct two-dimensional spatio-spectral map which may operate as an optical fingerprint. When the grating period is chirped along the grating direction, a diffracted signal may also be chirped along a plane of diffraction to provide broadband light with a time-varying carrier wavelength. The frequency at which a carrier wave changes its wavelength may be defined as the chirp rate and may be related to the rate of change of the Bragg period along the grating direction (e.g., within a thickness of the PS-LCVBG).

Further, a typical chirped VBG may provide a longitudinally varying Bragg period along the grating direction, but may have uniform properties across a transverse plane. In this configuration, the diffraction characteristics are constant across the transverse plane. However, a PS-LCVBG as disclosed herein may spatially-varying phase characteristics across a transverse plane as well as along the longitudinal direction.

For example, a longitudinal $\pi$ phase shift may introduce longitudinal interference among in- and out-of-phase waves diffracted across the grating thickness, which may effectively modify the element's spectroscopic properties. When a single phase-shift is embedded, the condition for complete destructive interference is realized at the Bragg wavelength, which results in a notch or dip in the reflectivity. In the case of a longitudinally chirped VBG, such a phase shift may result in a reflectivity notch in a diffracted spectrum having a center wavelength dependent on the depth of the $\pi$ phase shift along the grating direction (e.g., dependent on the local Bragg period in which the phase shift is located).

As disclosed herein, a PS-LCVBG may include an arbitrary distribution of longitudinal phase shifts (e.g., having values of π or any other suitable value) both along the grating direction and throughout the transverse plane. In this way, the PS-LCVBG may provide a spatially-varying reflectivity (e.g., of diffracted light) across the transverse plane.

In some embodiments, a PS-LCVBG includes a series of longitudinal phase shifts that continually vary in depth as a function of position in the transverse plane. For example, a series of longitudinal π phase shifts that continually varies in depth as a function of position in the transverse plane may provide a reflection notch having a center wavelength that varies as a function of position in the transverse plane. As a result, the spectral properties of reflected light may be tuned based on adjusting a position of incident light in the transverse plane. Further, it is contemplated herein that such a configuration may beneficially provide continuous hop-free tuning of the central wavelength of the reflectivity notch based on position in the transverse plane.

A PS-LCVBG may further include multiple longitudinal phase shifts at different depths (e.g., corresponding to different center wavelengths of a reflectivity notch) and/or multiple series of longitudinal phase shifts with continuously-varying depths as a function of position in a transverse plane. As a result, complex variations of reflectivity may be provided as a function of position in the transverse plane.

Additional embodiments are directed to a system for fabricating a PS-LCVBG. In some embodiments, a system includes an interferometer providing two arms arranged to provide interference within the bulk of a sample (e.g., PTR glass), where a first arm includes a convex cylindrical lens and the second arm includes a concave cylindrical lens, and where one of the arms includes a phase mask designed to produce a selected distribution of longitudinal phase shifts in the sample.

Additional embodiments are directed to systems incorporating a PS-LCVBG.

For example, some embodiments are directed to an emission source for generating narrowband coherent light with one or more unique central wavelengths. As an illustration, such an emission source may operate as a distributed feedback (DFB) laser including a PS-LCVBG formed in optically-active medium, where the PS-LCVBG has a spatially-varying distribution of longitudinal phase shifts providing a spatially-varying distribution of reflectivity in a transverse plane normal to the grating direction, and where the spatially-varying distribution of the reflectivity in a transverse plane comprises one or more reflectivity notches. The emission source may further include a pump source to generate pump light and one or more lenses to direct the pump light into the PS-LCVBG. Such an emission source may provide continuous hop-free wavelength tuning of output laser light (e.g., tuning of any of one or more central wavelengths) simply by controlling a transverse position of the pump light on the PS-LCVBG.

As another example, some embodiments are directed to an emission source suitable for generating tunable outputs in the GHz to THz spectral ranges. As an illustration, an emission source may include a PS-LCVBG with a reflectivity distribution having two reflectivity notches associated with each transverse position, where a spectral separation between the center wavelengths of the two reflectivity notches may change as a function of transverse position. The coherent output light from the PS-LCVBG may then be directed to a nonlinear material for the generation of higher optical frequency radiation via nonlinear processes (e.g., difference frequency generation (DFG), four-wave mixing, or the like).

Referring now to FIGS. 1A-7E, systems and methods providing a PS-LCVBG are described in greater detail, in accordance with one or more embodiments of the present disclosure.

A traditional VBG is formed as a grating structure associated within the volume of a solid material (e.g., a solid photosensitive material) with a periodic variation of refractive index along a grating vector $$k = \frac{2\pi}{d}.$$

This grating structure is typically extended in directions perpendicular to the grating vector k. The refractive index n of such a traditional VBG may be, but is not required to be, a simple sinusoidal function:

$$n(x, y, z) = \sin\left(\frac{2\pi}{d} \cdot y + \phi_0\right) = \sin(k \cdot y + \phi_0) \quad (1)$$

where the grating vector k corresponds to y (e.g., a Y axis in an XYZ coordinate space), d is a period of the VBG along the y direction (e.g., the grating vector k), and $\phi_0$ corresponds to a constant phase term. In this way, the refractive index of a traditional VBG at the XZ plane (or a transverse plane orthogonal to the grating vector more generally) may be constant. Such a traditional VBG may have a uniform period along the grating direction (e.g., a longitudinal direction) and a uniform phase distribution in a transverse plane $\Phi(x,z)=\phi_0$, where the phase associated with any position in any lateral plane is constant across the VBG.

In embodiments, a PS-LCVBG is formed as a chirped VGB having a grating period that continuously varies along the grating direction and a non-uniform transverse phase profile. In this way, the refractive index n may generally be written as:

$$n(x,y,z)=\sin(k(y)\cdot y+\Phi(x,z)). \quad (2)$$

Figure 1B:
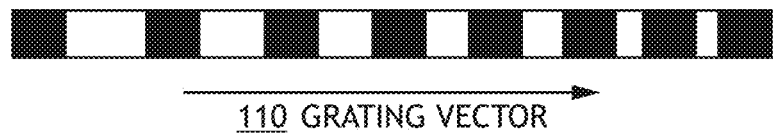
FIG. 1B is a side view of one region of the phase transformation device, in accordance with one or more embodiments of the present disclosure.
Figure 1B:
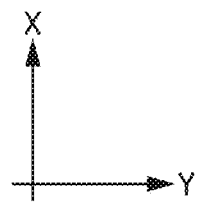
Figure 1C:
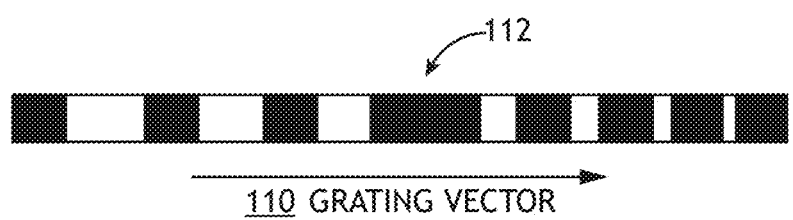
FIG. 1C is a side view of one region of the phase transformation device including a longitudinal phase shift, in accordance with one or more embodiments of the present disclosure.
Figure 1C:
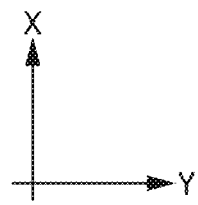

FIGS. 1A-1C depict a phase transformation device 100 formed as a PS-LCVBG 102 within a volume 104 of photosensitive material 106, in accordance with one or more embodiments of the present disclosure. In particular, FIG. 1A depicts a phase transformation device 100 as a solid block of material (e.g., photosensitive material 106 such as, but not limited to, PTR glass) with an input face 108 (e.g., a planar entrance face) oriented in an XZ plane. FIG. 1A further depicts a single PS-LCVBG 102 within a volume 104 of the phase transformation device 100, which has a grating vector 110 (k) oriented along a Y-axis of an XYZ coordinate space and normal to the input face 108. However, it is noted that the grating vector 110 of a PS-LCVBG 102 may generally be oriented in any direction with respect to the input face 108 so long as a condition for Bragg diffraction is satisfied for at least one wavelength of light incident on the input face 108.

FIG. 1A is a perspective view of the phase transformation device 100, in accordance with one or more embodiments of the present disclosure. FIG. 1B is a side view of one region of the phase transformation device 100, in accordance with one or more embodiments of the present disclosure. In particular, FIG. 1B illustrates longitudinal chirp of the PS-LCVBG 102, though it is noted that the depiction in FIG.

1B is greatly exaggerated for illustrative purposes. For example, the rate of chirp may be substantially lower than depicted in FIG. 1B such that there may be sufficient features around a particular location along the Y direction to provide Bragg diffraction for a particular wavelength.

In some embodiments, the PS-LCVBG 102 includes a series of longitudinal phase shifts distributed throughout the volume of the PS-LCVBG 102. FIG. 1C is a side view of one region of the phase transformation device 100 including a longitudinal phase shift 112, in accordance with one or more embodiments of the present disclosure. For example, FIG. 1C may depict a longitudinal π phase shift 112. As with FIG. 1B, the chirp is greatly exaggerated for illustrative purposes. As will be described in greater detail with respect to FIGS. 3A-3H, a PS-LCVBG 102 may generally include any number of longitudinal phase shifts 112 distributed along the grating vector 110 at any particular transverse location and/or at different transverse locations.

FIG. 1A further depicts an input beam 114 of light incident on the input face 108 and a reflected beam 116 of light emanating from the input face 108 upon reflective Bragg diffraction from a PS-LCVBG 102 within the volume 104 of the phase transformation device 100.

As used herein, the term reflected beam 116 is used to describe light that is reflected based on Bragg diffraction by a PS-LCVBG 102. For example, a condition for reflective Bragg diffraction may be:

$$\sin(\theta_B) = \frac{\lambda_B}{2nd} \quad (3)$$

where d is the period of the PS-LCVBG 102 along the grating vector 110, n is the average refractive index of the processed solid photosensitive material 106 including the PS-LCVBG 102, $\theta_B$ is a Bragg angle (e.g., an incidence angle of the input beam 114 and a corresponding reflection angle of the reflected beam 116 as measured from the grating vector 110), and $\lambda_B$ is the wavelength of diffracted light. It is contemplated herein that the conditions for reflective Bragg diffraction in Equation (3) for a particular PS-LCVBG 102 with fixed properties may be satisfied for different combinations of the wavelength $\lambda_B$ and the angle $\theta_B$, which allows for tunable operation of the PS-LCVBG 102 and the phase transformation device 100 more generally.

A PS-LCVBG 102 may generally be designed to provide reflection via Bragg diffraction (e.g., according to FIG. 3) for at least one wavelength of light incident on the input face 108, where the reflected beam 116 also exits the same input face 108. In this configuration, the phase transformation device 100 may operate as a reflective optical element based on the principles of Bragg diffraction. Further, a PS-LCVBG 102 may be designed to provide reflection via retroreflective Bragg diffraction. For example, at least a portion of light incident on the input face 108 at a normal incidence angle may be retroreflected via Bragg diffraction.

Further, although FIG. 1A depicts reflective Bragg diffraction, the phase transformation device 100 may have any number of polished faces suitable for transmission of light. In some embodiments, the phase transformation device 100 includes an additional face 118 parallel to the input face 108. In this way, portions of an input beam 114 that are not reflected by the PS-LCVBG 102 via Bragg diffraction may emerge from the additional face 118. Further, in a case where the phase transformation device 100 is formed from an optically active material, output light (e.g., output laser light) may emerge from additional face 118 and/or the input face 108. Additionally, and as will be described with respect to FIG. 2, the phase transformation device 100 may include additional polished faces orthogonal to the input face 108 for the purposes of recording the PS-LCVBG 102.

Figure 2:
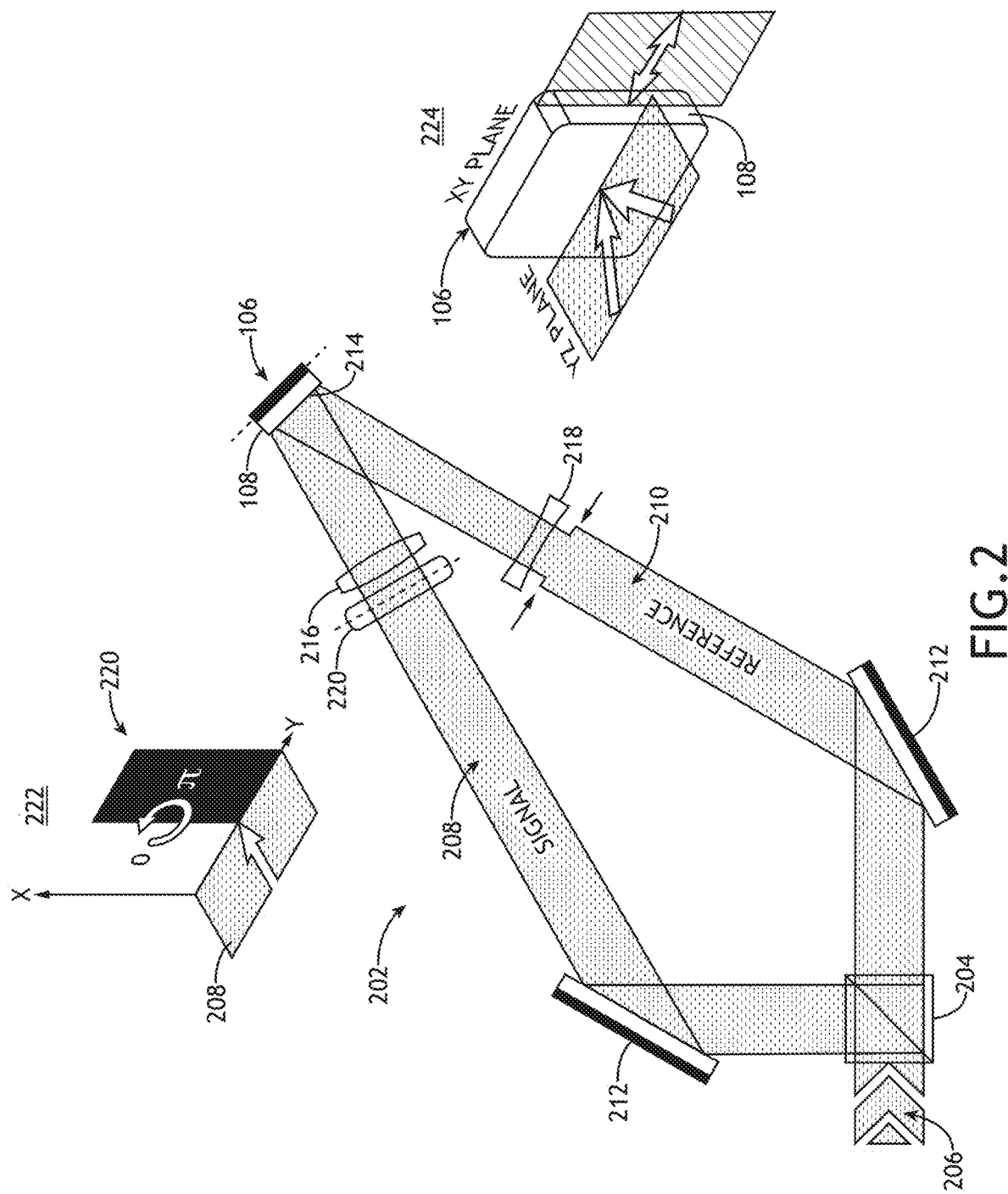
FIG. 2 is a simplified schematic of an interferometer for fabricating a PS-LCVBG 102, in accordance with one or more embodiments of the present disclosure.

Referring now to FIG. 2, fabrication of a PS-LCVBG 102 is described in greater detail. FIG. 2 is a simplified schematic of an interferometer 202 for fabricating a PS-LCVBG 102, in accordance with one or more embodiments of the present disclosure. It is to be understood, however, that a PS-LCVBG 102 may be fabricated using any suitable technique and that FIG. 2 and the associated description are provided solely for illustrative purposes and should not be interpreted as limiting.

In some embodiments, a PS-LCVBG 102 is formed by placing a photosensitive material 106 in an interferometer 202 such that an interference pattern associated with a desired reflective VBG is formed in the photosensitive material 106. In this way, one or more properties of the photosensitive material 106 may change in response to the incident illumination such that the interference pattern is exposed in the photosensitive material 106. As necessary, additional steps such as, but not limited to, heating the photosensitive material 106 may be performed to render the exposed interference pattern more permanent.

The photosensitive material 106 may include any photosensitive material known in the art suitable for supporting a phase transformation device 100. For example, the photosensitive material 106 may include a photosensitive glass, a photosensitive polymer, or the like.

In some embodiments, the photosensitive material 106 includes PTR glass. For example, PTR glass may include one or more photosensitive dopants and/or one or more halogen ions. As an illustration PTR glass may include, but is not limited to, sodium aluminosilicate glass containing sodium fluoride (NaF) and potassium bromide (KBr) along with silver, cerium, tin, and/or antimony oxides. Such a material may produce various photoionized states upon exposure with ultraviolet (UV) light (typically including silver) that may further crystallize into nucleation centers (e.g., nanoclusters, crystalline phases, or the like) upon thermal treatment (e.g., heating and/or cooling). Any suitable device may be used to provide the heat treatment including, but not limited to, an oven. Further, species such as NaF, NaBr, or the like may be formed during the thermal treatment. The resulting exposed interference pattern may be patterned into the volume of the photosensitive material 106. However, it is recognized herein that various compositions of PTR glass may be developed and that the present disclosure is not limited to any particular composition or any particular thermal treatment profile.

In some embodiments, a PS-LCVBG 102 is formed in a photosensitive material 106 directly as a result of exposure with light without the need for thermal treatment.

In some embodiments, the interferometer 202 includes a beamsplitter 204 (e.g., a non-polarizing beamsplitter) to split incident light 206 (e.g., recording light 206) suitable for exposing the desired interference pattern in the photosensitive material 106 into signal light 208 in a signal arm and reference light 210 in a reference arm. The light 206 may have any spectral properties and intensity suitable for exposing the interference pattern in the photosensitive material 106. For example, in the case of PTR glass, the light 206 may include UV illumination (e.g., 325 nm, or the like).

In some embodiments, the interferometer 202 further includes various optical elements (e.g., mirrors 212, or the like) to direct the signal light 208 and the reference light 210 in the two arms of the interferometer 202 to the photosensitive material 106 at angles necessary to produce a desired interference pattern associated with a PS-LCVBG 102 as disclosed herein. For example, as depicted in FIG. 2, the arms of the interferometer 202 may enter the phase transformation device 100 at a side face 214 (e.g., in an XY plane) orthogonal to the input face 108 to generate an interference pattern within the photosensitive material 106.

The interferometer 202 may further include various optical elements suitable for controlling the longitudinal chirp of the PS-LCVBG 102. In some embodiments, as depicted in FIG. 2, the interferometer 202 includes a convex cylindrical lens 216 in one arm of the interferometer 202 and a concave cylindrical lens 218 in another arm of the interferometer 202, where the planes of divergence of the convex cylindrical lens 216 and the concave cylindrical lens 218 are aligned. As an illustration, FIG. 2 depicts a configuration in which the convex cylindrical lens 216 is within a signal arm and the concave cylindrical lens 218 is within a reference arm, though this is not a requirement and these lenses may have any arrangement suitable for providing longitudinal chirp as depicted in FIGS. 1A-1C. For example, in FIG. 2, the planes of divergence of the convex cylindrical lens 216 and the concave cylindrical lens 218 correspond to the Y-Z plane, which may provide longitudinal chirp along the Y direction as depicted in FIGS. 1A-1C.

Further, the orientation of the grating vector 110 and/or the grating period d may be tuned or otherwise controlled based on the geometry of the interferometer 202 such as, but not limited to, the angles at which the light 206 is directed into the photosensitive material 106 or a power of the convex cylindrical lens 216 and/or the concave cylindrical lens 218.

In some embodiments, the interferometer 202 further includes a phase plate 220 located in one arm of the interferometer 202 (e.g., the signal arm prior to the concave cylindrical lens 218 as illustrated in FIG. 2). In this configuration, a phase plate 220 may introduce phase shifts into signal light 208 and thus into the interference pattern that forms the PS-LCVBG 102 within the photosensitive material 106. The phase plate 220 and the associated phase shifts may thus be added to the signal arm to modify the phase distribution of the PS-LCVBG 102. Further, the design, position, and/or orientation of the phase plate 220 may be selected or adjusted independent of other components of the interferometer 202 (e.g., the concave cylindrical lens 218, the convex cylindrical lens 216, or the like). In this way, the distribution of phase shifts introduced by the phase plate 220 may be effectively decoupled from the chirp axis (e.g., the grating vector 110) such that the phase shifts do not impact the orientation or the spectral rate-of-change of the chirp.

It is contemplated herein that a distribution of longitudinal phase shifts introduced by the phase plate 220 may modify the reflectivity (or the transmissivity) of the PS-LCVBG 102. In some embodiments, the distribution of longitudinal phase shifts introduced by the phase plate 220 results in a spatially-varying distribution of reflectivity (or transmissivity) when viewed along a transverse plane normal to the grating vector 110.

In some embodiments, one or more components of the interferometer 202 (e.g., the phase plate 220, the convex cylindrical lens 216, the concave cylindrical lens 218, the mirrors 212, or the like) are adjustable to allow adjustments of the phase distribution of the interference pattern in the photosensitive material 106 and thus the ultimate refractive index distribution. For example, one or more components of the interferometer 202 may be mounted on separate translation stages (e.g., rotational stages, linear stages, or the like) suitable for adjusting the associated angles and/or positions.

As an illustration, inset 222 depicts a phase plate 220 including two quadrants with π phase difference that may be rotated in an X-Y plane (e.g., by a rotational stage). As another illustration, inset 224 depicts the photosensitive material 106 that may be positioned in any orientation (e.g., via linear and/or rotational stages) to receive light from the interferometer 202.

Referring now to FIGS. 3A-3H, the fabrication and performance of various non-limiting examples of a PS-LCVBG 102 are described, in accordance with one or more embodiments of the present disclosure.

As described previously herein, the distribution of phase shifts within a PS-LCVBG 102 may be controlled by the phase plate 220 independent from the longitudinal chirp along the grating vector 110.

In some embodiments, the phase plate 220 includes a distribution of phase regions, where each phase region has a constant phase, and where there exists a step-wise variation in phase between phase regions. Each phase region may generally have any selected phase.

In some embodiments, the phase plate 220 includes an alternating distribution of phase regions having π phase differences (e.g., one-half the wavelength of the recording light 206 used to fabricate the PS-LCVBG 102). Such a configuration may induce longitudinal π phase shifts within the PS-LCVBG 102 (e.g., along the Y direction as depicted in FIG. 1C). For example, the phase plate 220 may include a binary arrangement of two phase regions as depicted in FIG. 2. As another example, the phase plate 220 may include a checkerboard arrangement of four or more phase regions.

It is contemplated herein that a longitudinal π phase shift in a PS-LCVBG 102 may result in complete destructive interference at the Bragg wavelength, which reveals a transmission notch in the diffraction spectrum of the PS-LCVBG 102. This notch may be alternately referred to as a reflection notch (e.g., a dip in the reflection spectrum), a transmission notch (e.g., a peak in a transmission spectrum), or a spectral notch more generally. In the case of a PS-LCVBG 102 (or a chirped VBG more generally) having a grating period that varies along the grating vector 110, the central wavelength associated with the notch may depend on the position of the longitudinal π phase shift along the grating vector 110 (e.g., a position of the longitudinal π phase within the depth of the PS-LCVBG 102).

Further, multiple longitudinal phase-shifts at a single transverse location (e.g., at different depths in the PS-LCVBG 102) may result in multiple notches at the corresponding Bragg wavelengths. As a result, a PS-LCVBG 102 recorded in the bulk of a photosensitive material 106 and characterized by an oversized optical footprint enables a spatially-varying distribution of notches across the transverse direction of the PS-LCVBG 102 (e.g., as characterized by a transverse plane). More precisely, for each locality along the transverse profile, either a single or multiple longitudinal π phase-shifts can be embedded at different positions along its thickness. Owing to the flexibility of holographic recording, the arrangement of these phase-shifts across a chirped grating's two-dimensional diffracting plane can be engineered in a well-defined, precise manner.

It is contemplated herein that the precise distribution of longitudinal phase shifts throughout the PS-LCVBG 102 may be controlled at least in part through the relative arrangement of signal light 208 and phase transition boundaries 302 between phase regions 304 of the phase plate 220).

As an illustration, FIGS. 3A-3H depict four different conditions for fabricating a PS-LCVBG 102.

Figure 3C:
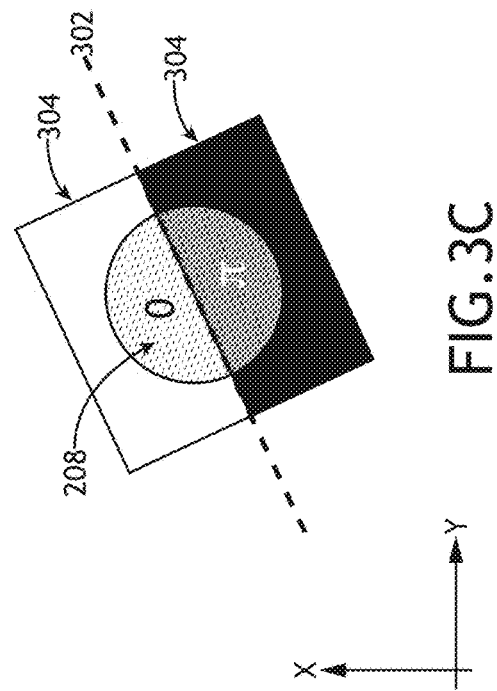
FIG. 3C is a conceptual view of signal light evenly distributed in a third orientation between two phase regions having $\pi$ phase shifts, in accordance with one or more embodiments of the present disclosure.
Figure 3D:
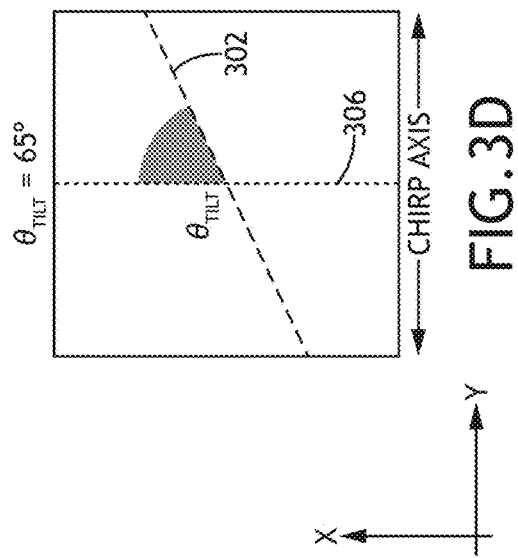
FIG. 3D is an illustrative plot of the orientation of a phase transition boundary between the phase regions relative to a chirp-axis normal associated with FIG. 3C, in accordance with one or more embodiments of the present disclosure.
Figure 3A:
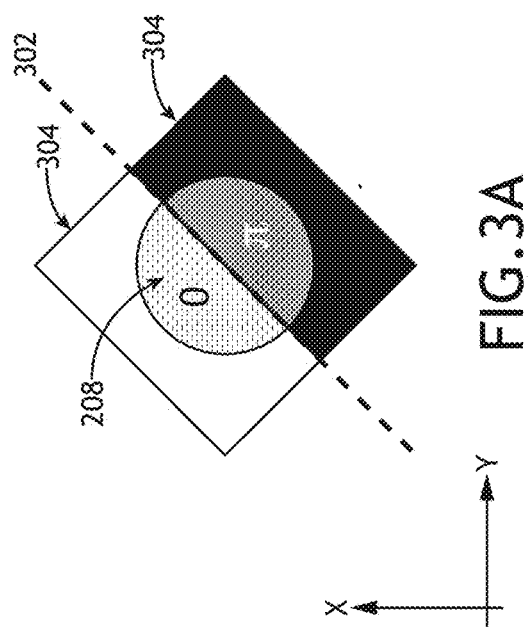
FIG. 3A is a conceptual view of signal light 208 evenly distributed in a third orientation between two phase regions 304 having a $\pi$ phase shift, in accordance with one or more embodiments of the present disclosure.
Figure 3B:
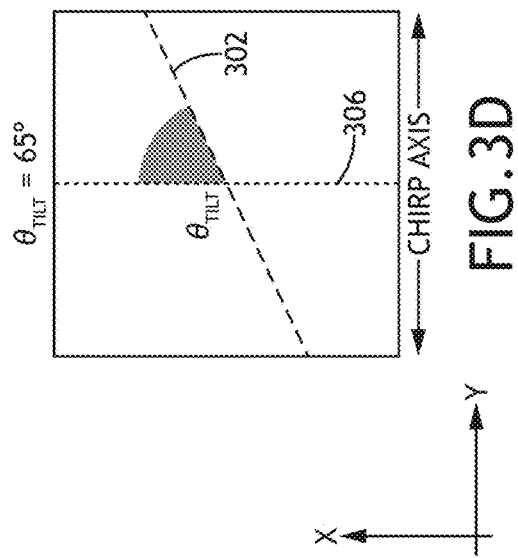
FIG. 3B is an illustrative plot of the orientation of a phase transition boundary between the phase regions relative to a chirp-axis normal associated with FIG. 3A, in accordance with one or more embodiments of the present disclosure.

FIG. 3A is a conceptual view of signal light 208 evenly distributed in a third orientation between two phase regions 304 having a π phase shift, in accordance with one or more embodiments of the present disclosure. FIG. 3B is an illustrative plot of the orientation of a phase transition boundary 302 between the phase regions 304 relative to a chirp-axis normal 306 associated with FIG. 3A, in accordance with one or more embodiments of the present disclosure. The chirp axis is associated with the fast axes of the convex cylindrical lens 216 and the concave cylindrical lens 218 (e.g., the Y axis here). In FIGS. 3A and 3B, the phase transition boundary 302 is rotated 45-degrees relative to the chirp-axis normal 306.

FIG. 3C is a conceptual view of signal light 208 evenly distributed in a third orientation between two phase regions 304 having π phase shifts, in accordance with one or more embodiments of the present disclosure. FIG. 3D is an illustrative plot of the orientation of a phase transition boundary 302 between the phase regions 304 relative to a chirp-axis normal 306 associated with FIG. 3C, in accordance with one or more embodiments of the present disclosure. In FIGS. 3C and 3D, the phase transition boundary 302 is rotated 65-degrees relative to the chirp-axis normal 306.

Figure 3E:
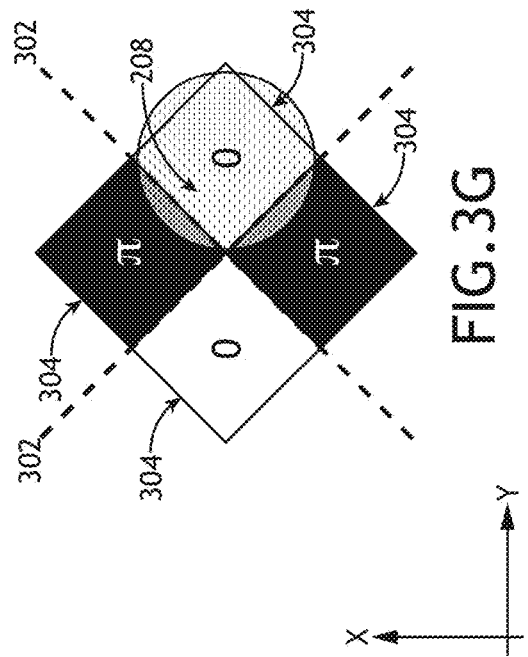
FIG. 3E is a conceptual view of signal light evenly distributed in a third orientation between four phase regions having $\pi$ phase shifts arranged in a checkerboard pattern, in accordance with one or more embodiments of the present disclosure.
Figure 3F:
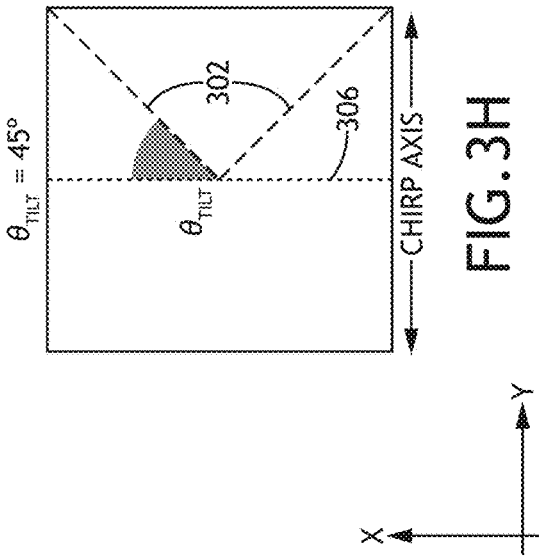
FIG. 3F is an illustrative plot of the orientation of a phase transition boundary between the phase regions relative to a chirp-axis normal associated with FIG. 3E, in accordance with one or more embodiments of the present disclosure.

FIG. 3E is a conceptual view of signal light 208 evenly distributed in a third orientation between four phase regions 304 having π phase shifts arranged in a checkerboard pattern, in accordance with one or more embodiments of the present disclosure. FIG. 3F is an illustrative plot of the orientation of phase transition boundaries 302 between the phase regions 304 relative to a chirp-axis normal 306 associated with FIG. 3E, in accordance with one or more embodiments of the present disclosure.

Figure 3G:
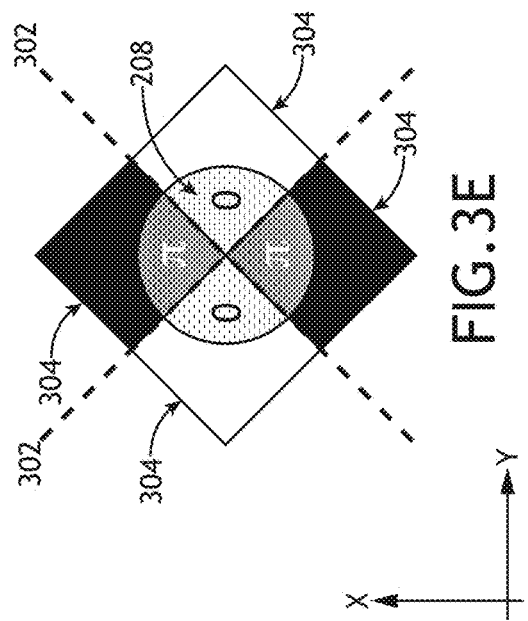
FIG. 3G is a conceptual view of signal light unevenly distributed in a fourth orientation between four phase regions having $\pi$ phase shifts arranged in a checkerboard pattern, in accordance with one or more embodiments of the present disclosure.
Figure 3H:
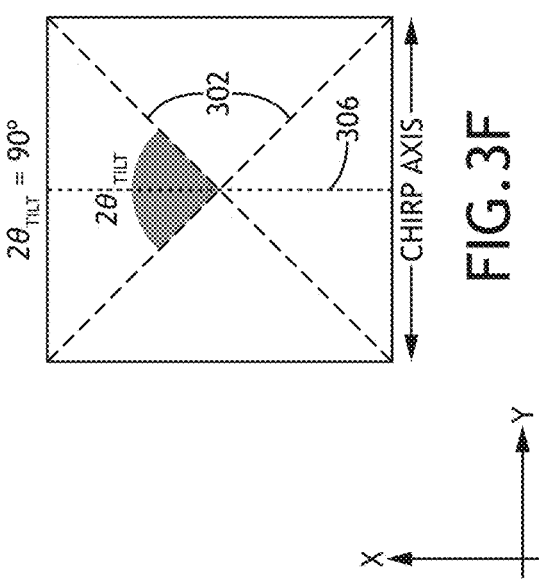
FIG. 3H is an illustrative plot of the orientation of a phase transition boundary between the phase regions relative to a chirp-axis normal associated with FIG. 3G, in accordance with one or more embodiments of the present disclosure.

FIG. 3G is a conceptual view of signal light 208 unevenly distributed in a fourth orientation between four phase regions 304 having π phase shifts arranged in a checkerboard pattern, in accordance with one or more embodiments of the present disclosure. FIG. 3H is an illustrative plot of the orientation of a phase transition boundary 302 between the phase regions 304 relative to a chirp-axis normal 306 associated with FIG. 3G, in accordance with one or more embodiments of the present disclosure. It is noted that the configuration depicted in FIGS. 3G and 3H is substantially similar to that depicted in FIGS. 3E and 3F, except that the signal light 208 is laterally translated relative to the phase plate 220 (or vice versa).

Referring generally to FIGS. 3A-3H, it is noted that the design, orientation, an/or position of the phase plate 220 may be adjusted to control a pattern of phase transition boundaries 302 across the signal light 208. As will be described in greater detail below, this pattern of phase transition boundaries 302 across the signal light 208 may control both the spatial distribution of spectral notches (e.g., dips in a reflection spectrum or peaks in a transmission spectrum) across the transverse plane of the PS-LCVBG 102 and the central wavelengths of these notches in a manner that is decoupled from the longitudinal chirp of the PS-LCVBG 102. Notably, FIGS. 3A-3B and 3C-3D depict a single linear phase transition boundary 302 across the signal light 208, FIGS. 3E-3F depict an X-shaped distribution of phase transition boundaries 302 across the signal light 208, and FIGS. 3G-3H depict a V-shaped distribution of phase transition boundaries 302 across the signal light 208.

Figure 4A:
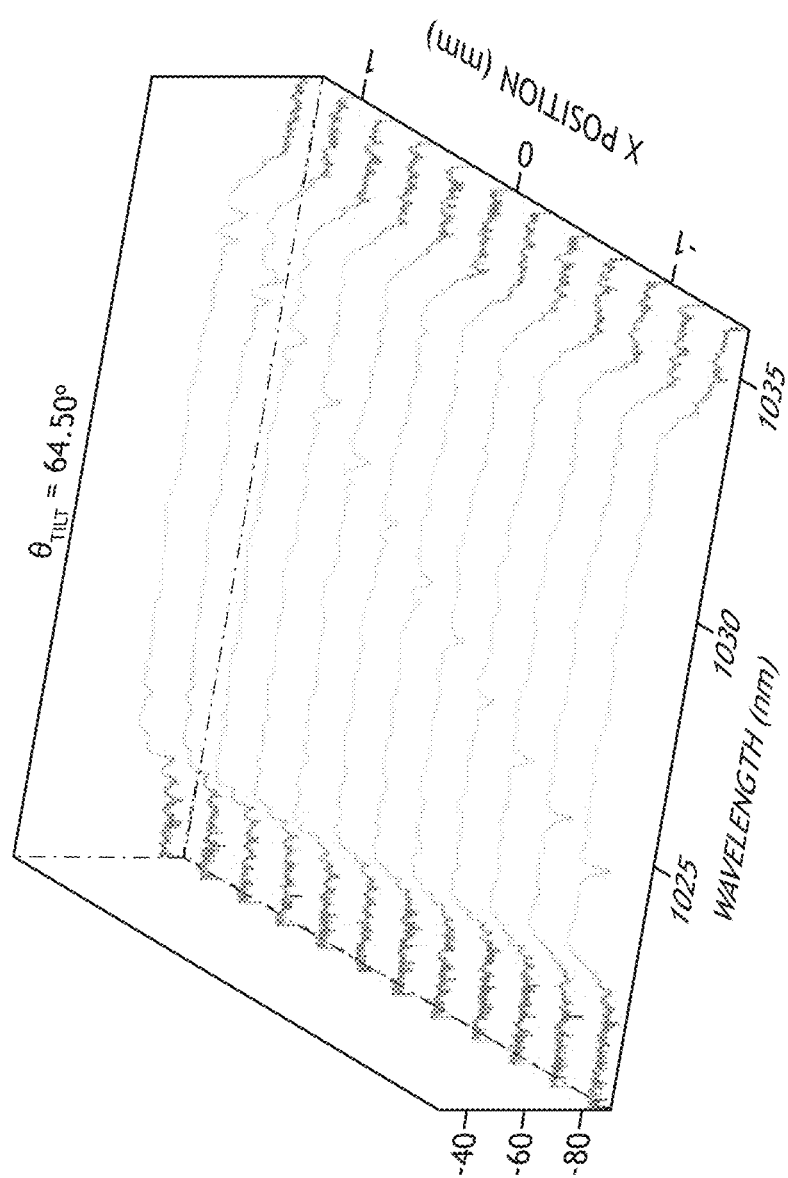
FIG. 4A is a reflectivity plot of a PS-LCVBG 102 formed using a 65-degree tilt as shown in FIGS. 3C and 3D, in accordance with one or more embodiments of the present disclosure.
Figure 4B:
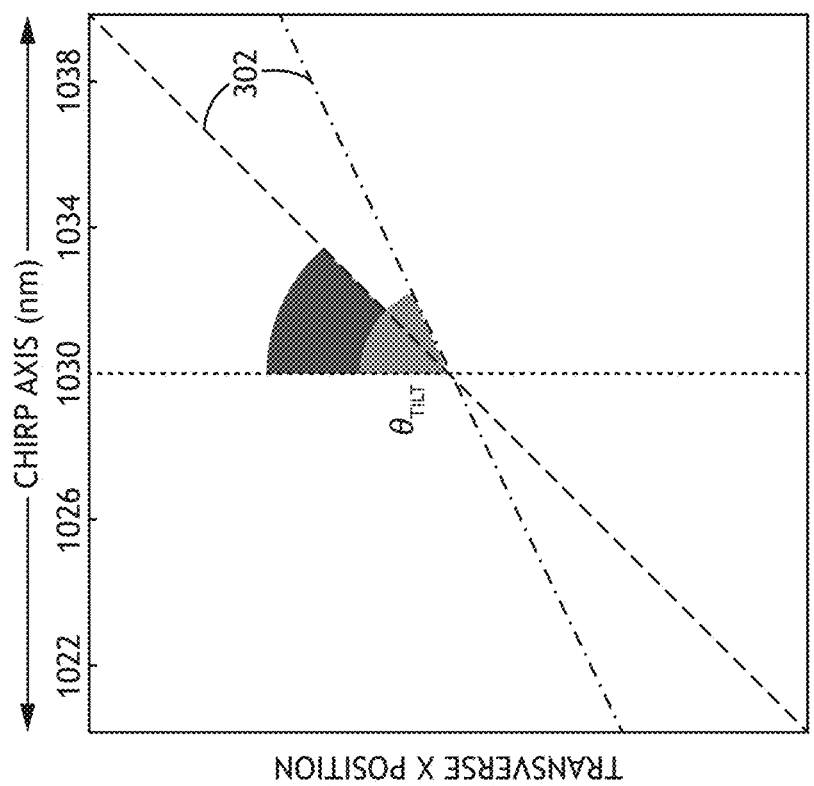
FIG. 4B is an illustrative plot of the orientations of the phase transition boundaries relative to a chirp-axis normal from FIGS. 3B and 3D, in accordance with one or more embodiments of the present disclosure.
Figure 4C:
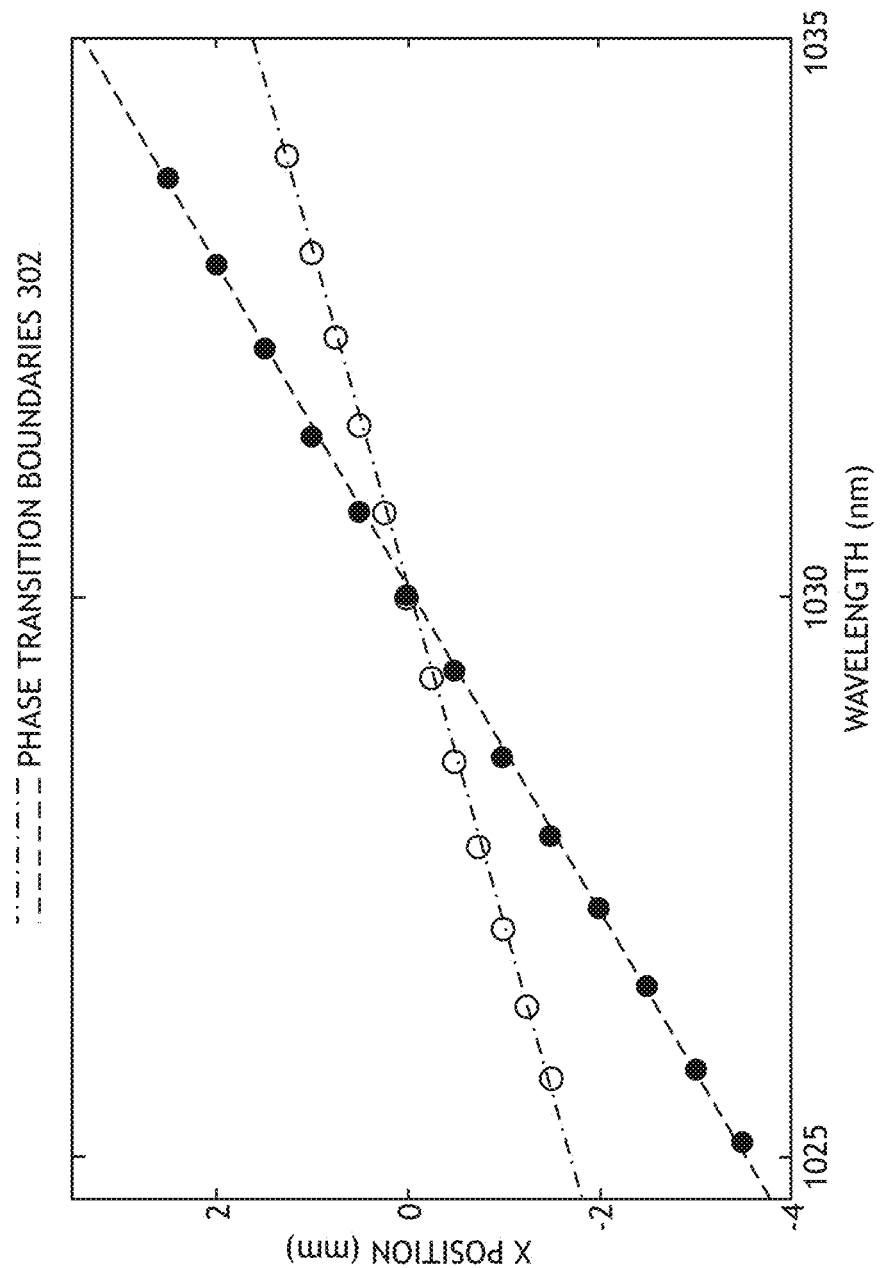
FIG. 4C is a plot of the center wavelength of a reflectivity notch as a function of transverse position for the two orientations of the phase plate described by FIG. 4B, in accordance with one or more embodiments of the present disclosure.

FIGS. 4A-4C illustrate the spectral properties of a PS-LCVBG 102 fabricated with a single linear phase transition boundary 302. FIG. 4A is a reflectivity plot of a PS-LCVBG 102 formed using a 65-degree tilt as shown in FIGS. 3C and 3D, in accordance with one or more embodiments of the present disclosure. As described previously herein, the phase transition boundary 302 induces destructive interference at the Bragg wavelength and a corresponding reflectivity notch, where the center wavelength of the reflectivity notch depends on the location of the phase transition boundary 302 along the chirp axis (e.g., the grating vector 110 along the Y direction here). Further, as shown in FIG. 3A-3H, the phase plate 220 provides a distribution of phase transition boundaries 302 that are recorded in the XY plane of the PS-LCVBG 102. As a result, the design of phase transition boundaries 302 in the phase plate 220 allows for control of the location of the phase transition boundary 302 along the chirp axis (and thus the center wavelength of the reflectivity notch) as a function of transverse position (here, along the X axis). As shown in FIG. 4A, a linear phase transition boundary 302 in the XY plane provided by the phase plate 220 results in a linearly-varying modification of the center wavelength of a reflectivity notch as a function of transverse position across the PS-LCVBG 102 (here, as a function of position along the X axis). As a result, the operation of the PS-LCVBG 102 may be tuned simply by adjusting a transverse position of incident light on the PS-LCVBG 102. Notably, the center wavelength of the reflectivity notch of such a PS-LCVBG 102 may be continuously tuned (e.g., mode-hop free tuned) based on the transverse position of incident light on the PS-LCVBG 102.

Referring now to FIGS. 4B and 4C, the rate of change of the center wavelength shift along the transverse direction may be adjusted by rotating the phase plate 220 in the XY plane, which effectively modifies a slope of the phase transition boundary 302 in the XY plane. FIG. 4B is an illustrative plot of the orientations of the phase transition boundaries 302 relative to a chirp-axis normal 306 from FIGS. 3B and 3D, in accordance with one or more embodiments of the present disclosure. FIG. 4C is a plot of the center wavelength of a reflectivity notch as a function of transverse position (e.g., X position here) for the two orientations of the phase plate 220 described by FIG. 4B, in accordance with one or more embodiments of the present disclosure. As shown in FIG. 4C, the slope of a phase transition boundary 302 in the XY plane provided by the phase plate 220 directly corresponds to a rate of change of the center wavelength of the reflectivity notch as a function of transverse position.

Figure 5A:
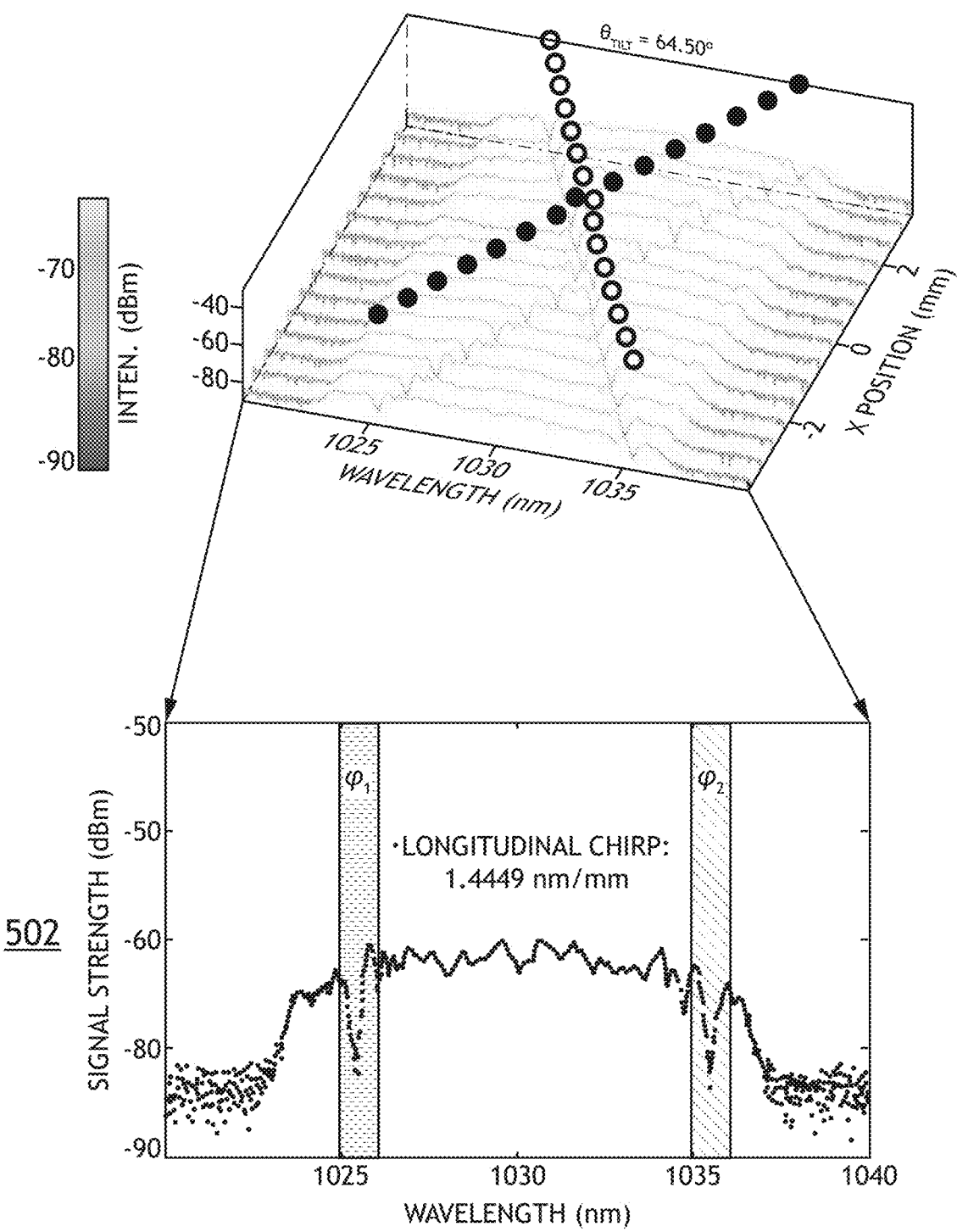
FIG. 5A is a reflectivity plot of a PS-LCVBG formed with an X-shaped distribution of phase transition boundary across the signal light as illustrated in FIGS. 3E-3F, in accordance with one or more embodiments of the present disclosure.
Figure 5B:
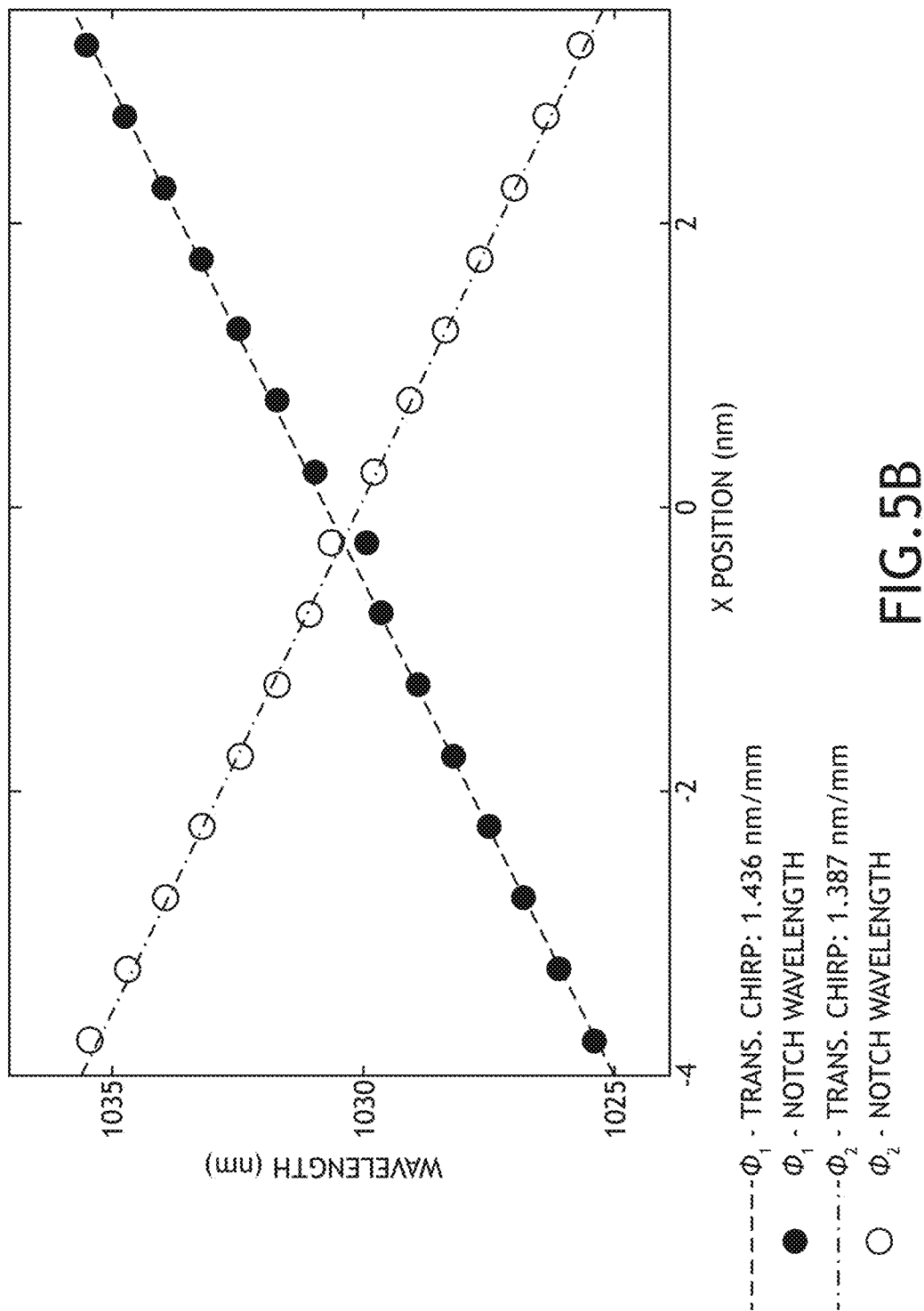
FIG. 5B is a plot of the center wavelength of the reflectivity notches as a function of transverse position for the orientation of the phase plate described by FIG. 5A, in accordance with one or more embodiments of the present disclosure.

FIGS. 5A-6B illustrate the spectral properties of a PS-LCVBG 102 fabricated with a multiple phase transition boundaries 302. FIG. 5A is a reflectivity plot of a PS-LCVBG 102 formed with an X-shaped distribution of phase transition boundaries 302 across the signal light 208 as illustrated in FIGS. 3E-3F, in accordance with one or more embodiments of the present disclosure. FIG. 5B is a plot of the center wavelength of the reflectivity notches as a function of transverse position for the orientation of the phase plate 220 described by FIG. 5A, in accordance with one or more embodiments of the present disclosure. In this configuration, each phase transition boundary 302 provides a separate reflectivity notch with linearly-varying center wavelength as a function of transverse position. Further, the X-shaped distribution results in two reflectivity notches at each transverse position (aside from a crossover point) as illustrated in the inset 502, where the spectral separation depends on the transverse position. In FIG. 5B, the rate of change of the center wavelength as a function of transverse position is referred to as transverse (Trans.) chirp.

Figure 6A:
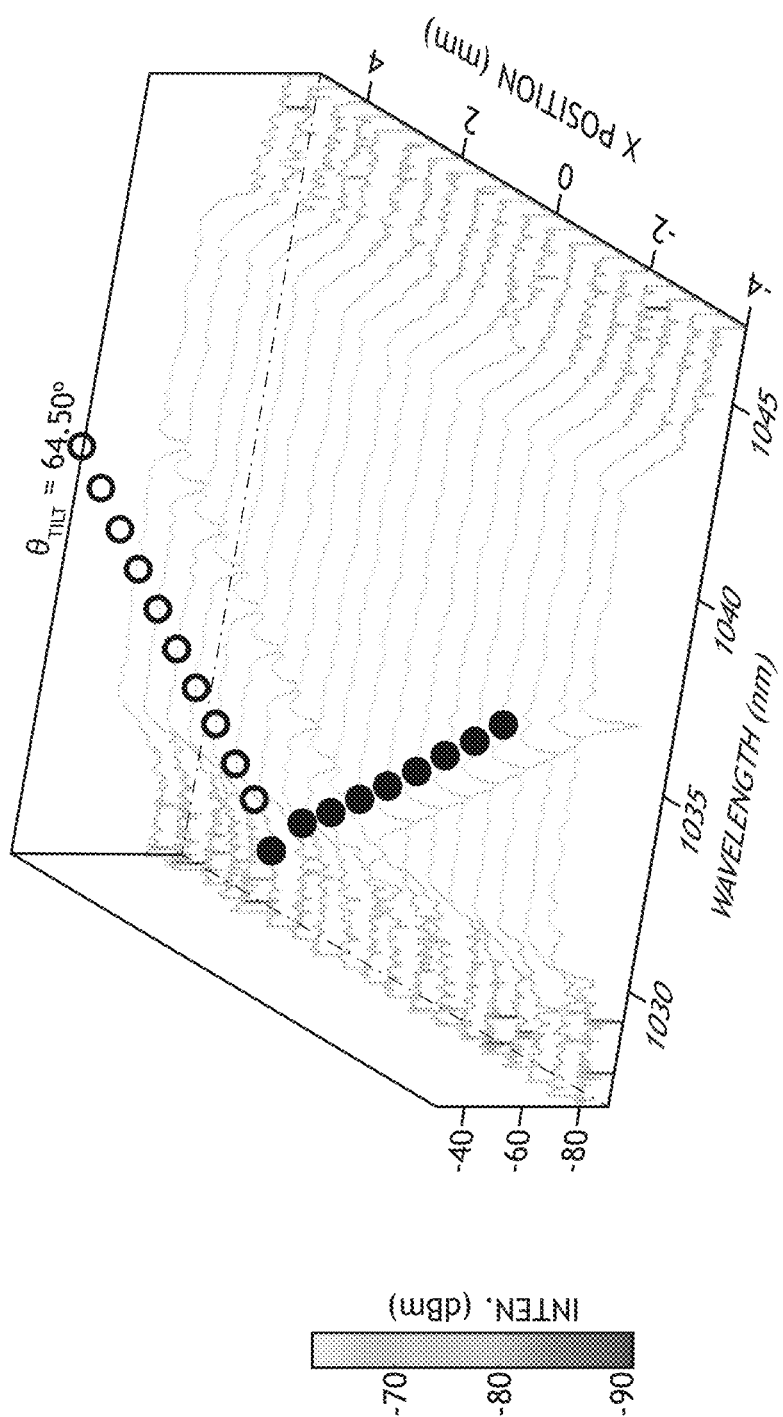
FIG. 6A is a reflectivity plot of a PS-LCVBG formed with a V-shaped distribution of phase transition boundary across the signal light as illustrated in FIGS. 3G-3H, in accordance with one or more embodiments of the present disclosure.
Figure 6B:
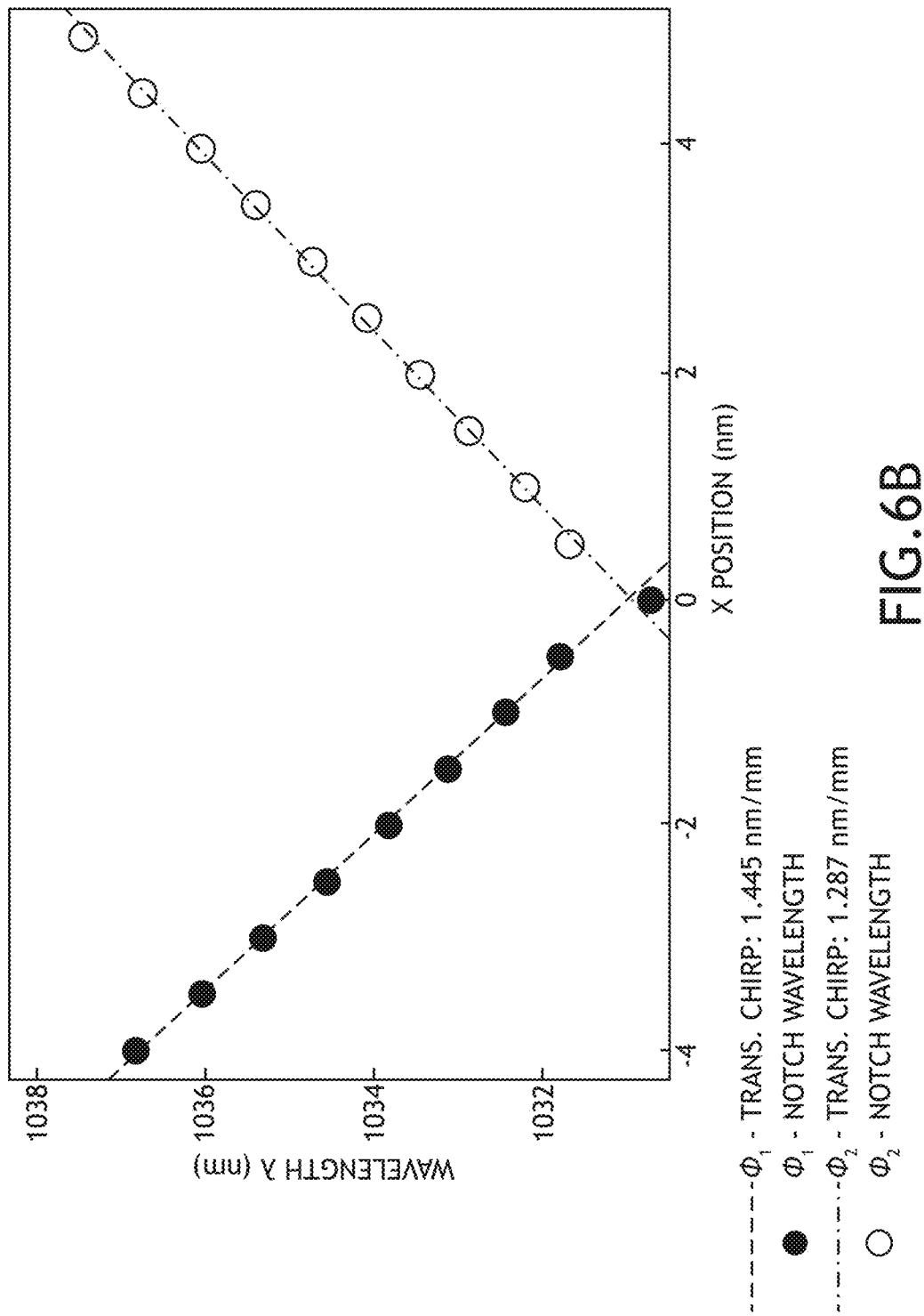
FIG. 6B is a plot of the center wavelength of the reflectivity notches as a function of transverse position for the orientation of the phase plate described by FIG. 6A, in accordance with one or more embodiments of the present disclosure.

FIG. 6A is a reflectivity plot of a PS-LCVBG 102 formed with a V-shaped distribution of phase transition boundary 302 across the signal light 208 as illustrated in FIGS. 3G-3H, in accordance with one or more embodiments of the present disclosure. FIG. 6B is a plot of the center wavelength of the reflectivity notches as a function of transverse position for the orientation of the phase plate 220 described by FIG. 6A, in accordance with one or more embodiments of the present disclosure. In this configuration, each phase transition boundary 302 provides a separate reflectivity notch with linearly-varying center wavelength, where the spectral separation increases as a function of transverse position.

Referring generally to FIGS. 3A-6B, it is to be understood that FIGS. 3A-6B and the associated descriptions are provided solely for illustrative purposes and should not be interpreted as limiting. A PS-LCVBG 102 may be fabricated with any spatially-varying distribution of longitudinal phase shifts that may include, but are not limited to, longitudinal π phase shifts. In particular, each transverse location within a transverse plane (e.g., an XZ plane) orthogonal to the grating vector 110 (e.g., the Y direction) may be associated with any number (e.g., zero or more) of longitudinal phase shifts which may provide a spatially-varying reflectivity distribution across the transverse plane. In the case of longitudinal π phase shifts, each transverse location may thus provide any number of reflectivity notches (or transmission peaks) having center wavelengths associated with the position of the longitudinal π phase shifts along the longitudinally-chirped grating vector 110.

In some embodiments, the spatially-varying reflectivity distribution in the transverse plane includes at least one continuously-varying distribution of reflectivity notches having a continuously-varying distribution of center wavelengths. For example, FIGS. 3A-6B depict configurations providing a spatially-varying reflectivity distribution of reflectivity notches having one or more linear distributions of center wavelengths. However, it is noted that the distributions of center wavelengths of a series of reflectivity notches (or changes in the reflectivity more generally) need to be linearly-varying in a transverse direction. For example, the spatially-varying reflectivity distribution in the transverse plane may vary with any continuous monotonic or non-monotonic distribution. In some applications, the spatially-varying reflectivity distribution in the transverse plane may vary quadratically. As another example, the spatially-varying reflectivity distribution in the transverse plane need not vary continuously, but may include discrete jumps or other modifications. As a result, a PS-LCVBG 102 fabricated as depicted in FIG. 2 may be fabricated using any type of phase plate 220 with any distribution of phase transition boundaries 302 relative to the Referring now to FIGS. 7A-7E, systems incorporating a phase transformation device 100 are described in greater detail, in accordance with one or more embodiments of the present disclosure.

In some embodiments, a phase transformation device 100 with a PS-LCVBG 102 fabricated from a photo-luminescent photosensitive material 106 operates as an optically-active medium. For example, the photosensitive material 106 may include any type of photo-sensitive material that supports a population inversion suitable for providing optical gain such as, but not limited to, doped PTR glass (e.g., Yb-doped PTR glass, Er-doped PTR glass, or the like).

It is contemplated herein that a PS-LCVBG 102 fabricated from a photo-luminescent photosensitive material 106 may operate as a coherent emission source providing coherent light with one or more center wavelengths, where each center wavelength is associated with a spectral notch as described herein.

Figure 7A:
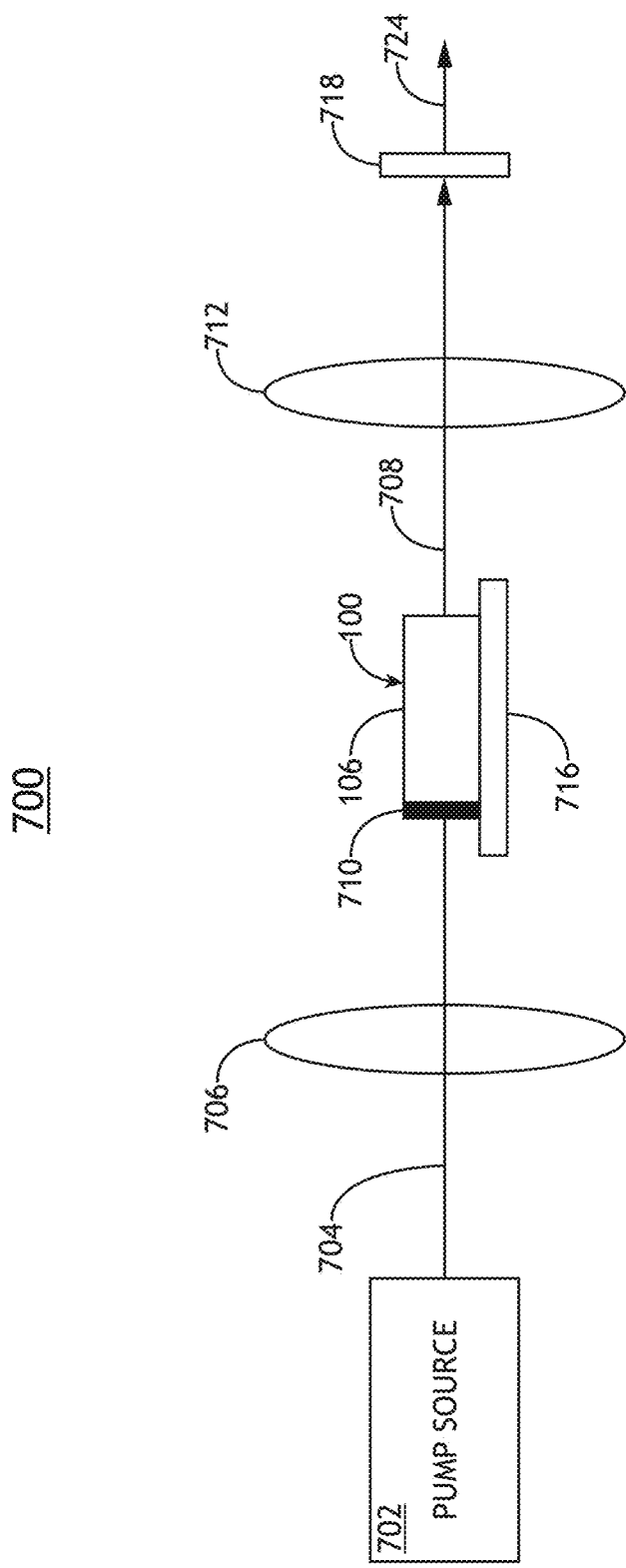
FIG. 7A is a conceptual diagram of an emission source including a phase transformation device with a PS-LCVBG within a photo-luminescent photosensitive material, in accordance with one or more embodiments of the present disclosure.

FIG. 7A is a conceptual diagram of an emission source 700 including a phase transformation device 100 with a PS-LCVBG 102 within a photo-luminescent photosensitive material 106, in accordance with one or more embodiments of the present disclosure.

In some embodiments, the emission source 700 includes a pump source 702 configured to generate pump light 704 and one or more lenses 706 configured to direct the pump light 704 to the PS-LCVBG 102. The pump light 704 may include any spectrum that is at least partially absorbed by the photo-luminescent photosensitive material 106. The pump source 702 may include any suitable emitter of pump light 704 such as, but not limited to, one or more lasers (e.g., diode lasers, or the like) or one or more lamp sources.

The pump source 702 and the lenses 706 may generally be arranged in any configuration and may provide the pump light 704 through any face of the photosensitive material 106. FIG. 7A illustrates a non-limiting example of an end-pumped configuration in which the pump light 704 is directed along the direction of the grating vector 110 (e.g., along the Y direction as depicted in FIGS. 1A-1C).

The pumping action of the pump source 702 may produce spontaneous emission in the optically active volume of the photo-luminescent photosensitive material 106. Due to periodic changes in the local refractive index associated with the PS-LCVBG 102, a minute fraction of spontaneously emitted light is back-scattered at each period of the PS-LCVBG 102. These reflections, collected along the grating volume in a directional manner, coherently interfere to produce a standing-wave pattern that constitutes a coherent output laser beam 708. Thus, optical feedback is achieved via the mechanism of Bragg scattering, unlike conventional resonators which employ two end-mirrors for the same purpose. Further, a longitudinal π phase shift within the PS-LCVBG 102 provides single-wavelength emission at the Bragg wavelength, where the emission wavelength corresponds to the center wavelength of a reflectivity notch (e.g., a transmissivity peak) as described previously herein.

In a general sense, the emission source 700 may generate two output laser beams 708 in opposite directions along the grating vector 110 (e.g., along the Y direction here) for any region of the PS-LCVBG 102 that is pumped with the pump light 704 and for which the conditions for lasing are present. In some embodiments, the further includes a coating 710 (e.g., a dielectric coating, or the like) designed to be highly reflective for wavelengths within the emission bandwidth of doped PTR glass and thus provide laser output along a single direction (e.g., emerging from a single face of the photosensitive material 106. For example, such a coating 710 may be provided on one of the faces (e.g., the input face 108 and/or the additional face 118) of the photosensitive material 106.

In some embodiments, the emission source 700 further includes one or more collection lenses 712 configured to collect and/or shape at least one output laser beam 708.

The PS-LCVBG 102 within an emission source 700 may have any design including at least one longitudinal π phase shift. In this way, the emission source 700 may provide at least one output laser beam 708.

In some embodiments, the PS-LCVBG 102 within an emission source 700 provides a narrowband output laser beam 708 with a single center wavelength, where the center wavelength is tunable as a function of transverse position across the PS-LCVBG 102. Such a configuration may be in essence a DFB laser. For example, the PS-LCVBG 102 may provide a single reflectivity notch with a continuously-varying center wavelength as a function of transverse position. In some cases, the PS-LCVBG 102 provides a single reflectivity notch with a linearly-varying center wavelength as a function of transverse position as illustrated in FIGS. 3A-3D and 4A-4C.

Figure 7B:
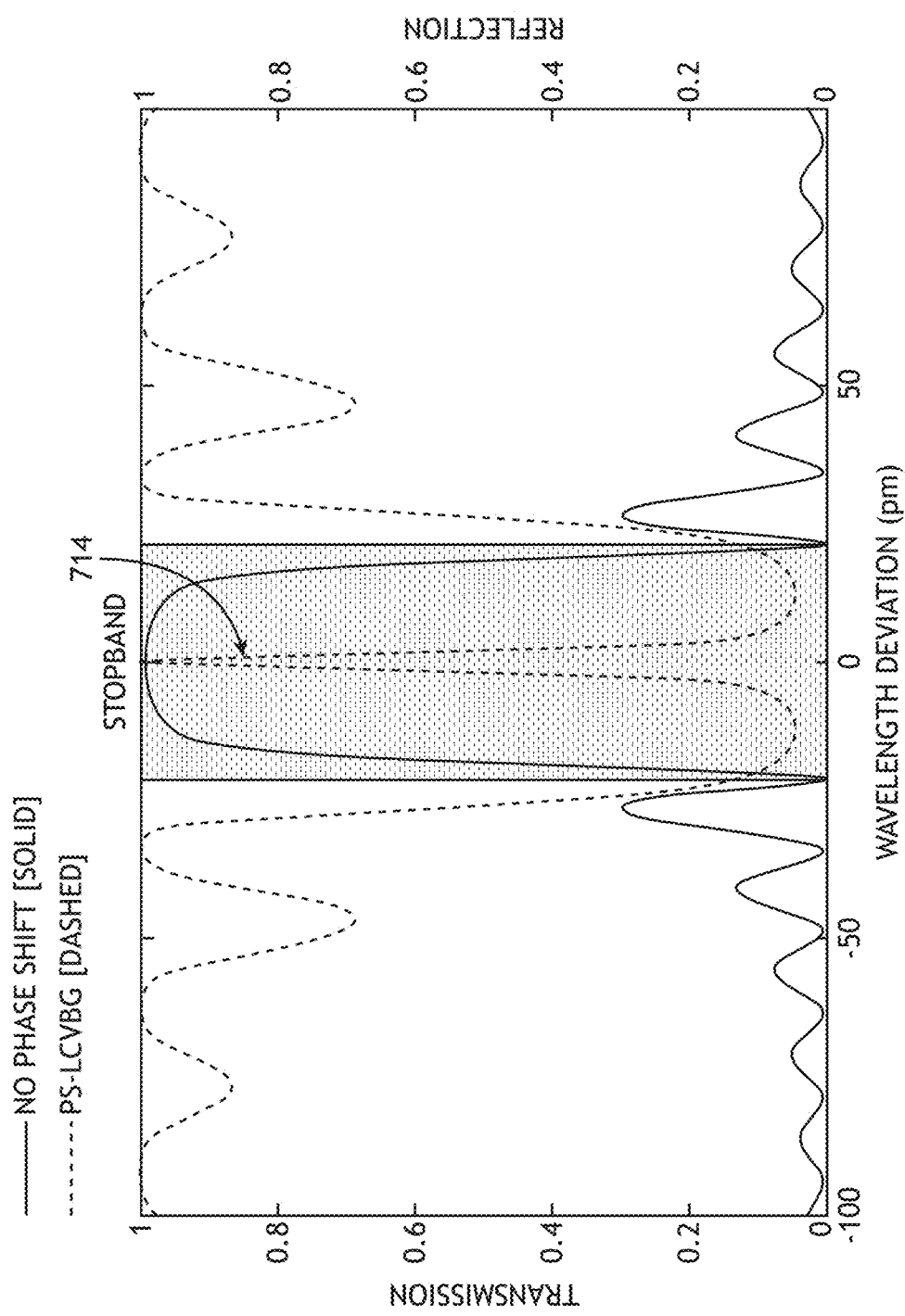
FIG. 7B is a plot of the diffraction spectrum of a PS-LCVBG with transversely-varying longitudinal $\pi$ phase shifts in relation to a stopband of an equivalent grating without longitudinal $\pi$ phase shifts, in accordance with one or more embodiments of the present disclosure.
Figure 7C:
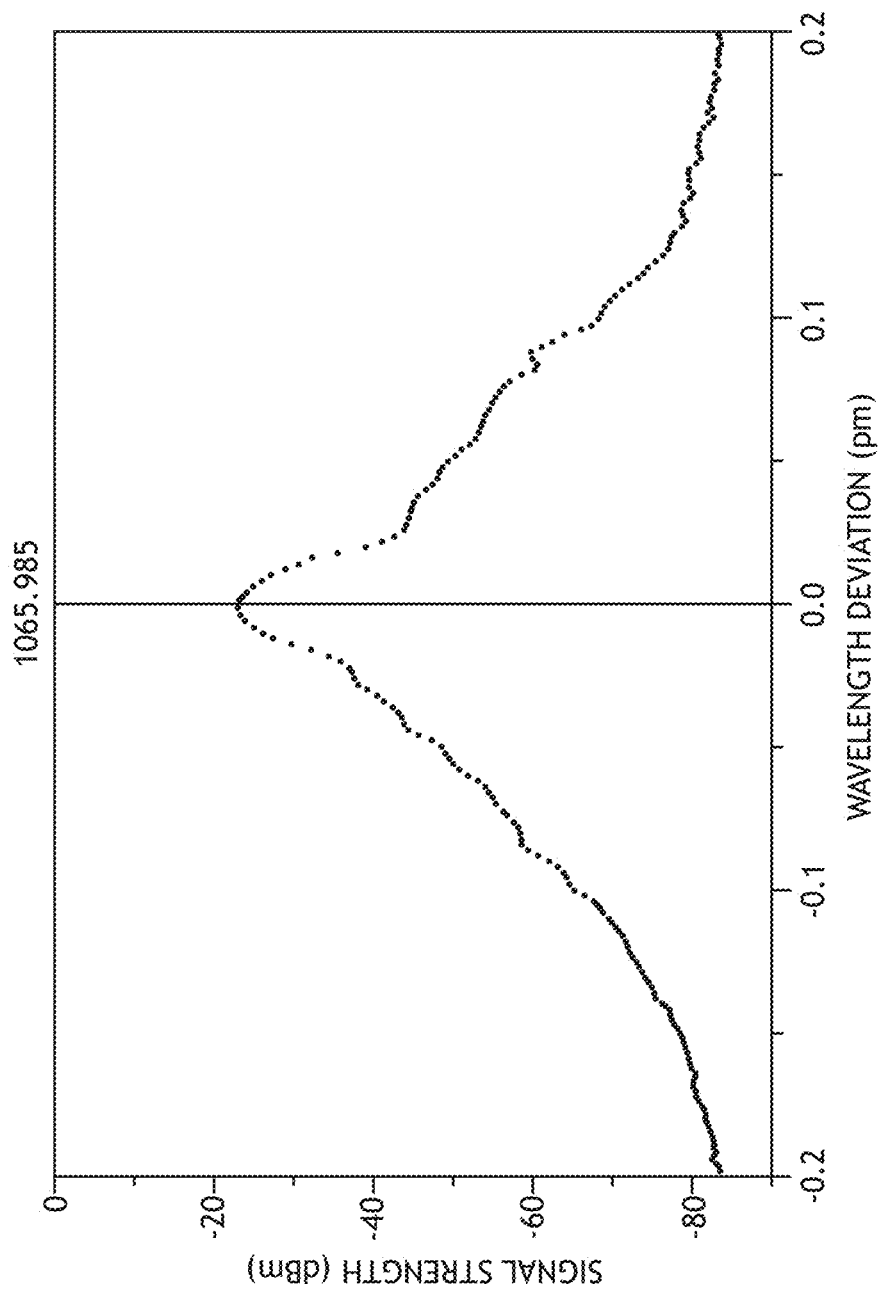
FIG. 7C is a plot of the output spectrum of the emission source as measured by an optical spectrum analyzer, in accordance with one or more embodiments of the present disclosure.
Figure 7D:
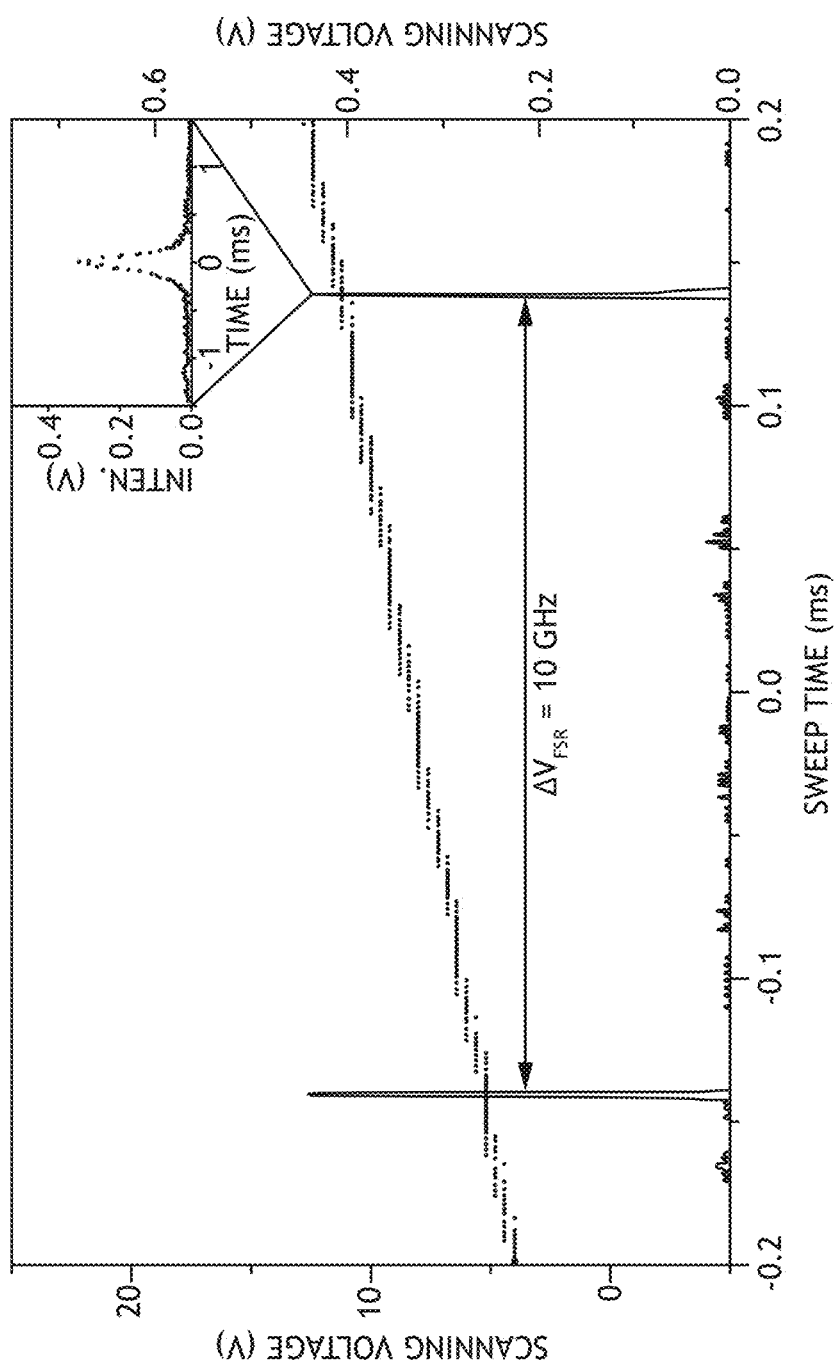
FIG. 7D is a plot of the modal spectrum of the emission source obtained by a scanning Fabry-Perot with 10 GHz of free spectral range, in accordance with one or more embodiments of the present disclosure.

FIGS. 7B-7D include experimental demonstrations of an emission source 700 operating as a DFB laser. In FIGS. 7B-7D, the photosensitive material 106 is formed as a 12 mm-long block of $Yb^{3+}$:PTR glass doped with 2 wt. % of Yb3+ ions. Further, the PS-LCVBG 102 was fabricated with a phase plate 220 with a single linear phase transition boundary 302 to provide a single reflectivity notch with a linearly varying center wavelength near 1066 nm. The pump light 704 in FIG. 7A is tuned to around 981 nm to match a peak absorption of the doped photosensitive material 106.

FIG. 7B is a plot of the diffraction spectrum of a PS-LCVBG 102 with transversely-varying longitudinal π phase shifts in relation to a stopband of an equivalent grating without longitudinal π phase shifts, in accordance with one or more embodiments of the present disclosure. In particular, FIG. 7B illustrates a transmission spectrum of the PS-LCVBG 102 depicting a sharp transmission peak 714 associated with the longitudinal π phase shift a reflection spectrum of an equivalent grating without the longitudinal π phase shift. In the configuration shown in FIG. 7B, the emission source 700 emits a single axial-mode output laser beam 708 near 1066 nm. FIG. 7C is a plot of the output spectrum of the emission source 700 as measured by an optical spectrum analyzer (OSA), in accordance with one or more embodiments of the present disclosure. FIG. 7D is a plot of the modal spectrum of the emission source 700 obtained by a scanning Fabry-Perot with 10 GHz of free spectral range, in accordance with one or more embodiments of the present disclosure. The plot in FIG. 7D reveals the single-mode characteristics of the output laser beam 708.

The center wavelength of the output laser beam 708 may be tuned by adjusting a relative transverse position of the pump light 704 with respect to the PS-LCVBG 102. Further, a PS-LCVBG 102 with transversely-varying spectral properties may provide continuous hop-free tuning of the center wavelength of the output laser beam 708.

The emission source 700 may include any type or combination of components suitable for adjusting the relative transverse position (e.g., position in an XZ plane) of the pump light 704 with respect to the PS-LCVBG 102. In some embodiments, as illustrated in FIG. 7A, the emission source 700 includes a translation stage 716 configured to position the PS-LCVBG 102 relative to incident pump light 704. In some embodiments, the emission source 700 includes one or more components to modify a position of the pump light 704 relative to the PS-LCVBG 102 such as, but not limited to, adjustable mirrors or translation stages connected to the pump source 702 and/or the lenses 706.

In some embodiments, the PS-LCVBG 102 within an emission source 700 provides an output laser beam 708 with emission in two or more narrowband spectral regions having different center wavelengths. In particular, a PS-LCVBG 102 may include two or more longitudinal π phase shifts associated with at least one transverse position. to provide two or more spectral notches at that position and thus emission at associated wavelengths. Such a configuration may provide multiple optical resonances in different regions along the grating vector 110. However, the optical resonances are associated with a common grating generated using a single exposure (e.g., associated with interference of reference light 210 with signal light 208 modified with a photosensitive material 106 as illustrated in FIG. 2), the local Bragg-period shifts are coherently correlated in phase. A phase correlation thus exists between the light with the different center wavelengths. Further, mode competition is inherently minimized for sources of this kind since the resonances are associated with different spatial regions of the PS-LCVBG 102.

It is contemplated herein that such a multi-wavelength emission source 700 may be used for a variety of applications such as, but not limited to generation of high optical frequency radiation such as, but not limited to, GHz or THz waves. For example, high optical frequency radiation may be generated by combining coherent beams with different optical frequencies (e.g., different wavelengths) in a nonlinear material 718 through a nonlinear process such as, but not limited to, difference frequency generation (DFG) or four-wave mixing. In this configuration, any suitable nonlinear material 718 may be used including, but not limited to, an organic crystal (e.g., 4-N,N-dimethylamino-4-N-methyl stilbazolium tosylate (DAST), or the like) or a non-organic crystal (Lithium Niobate, or the like).

Figure 7E:
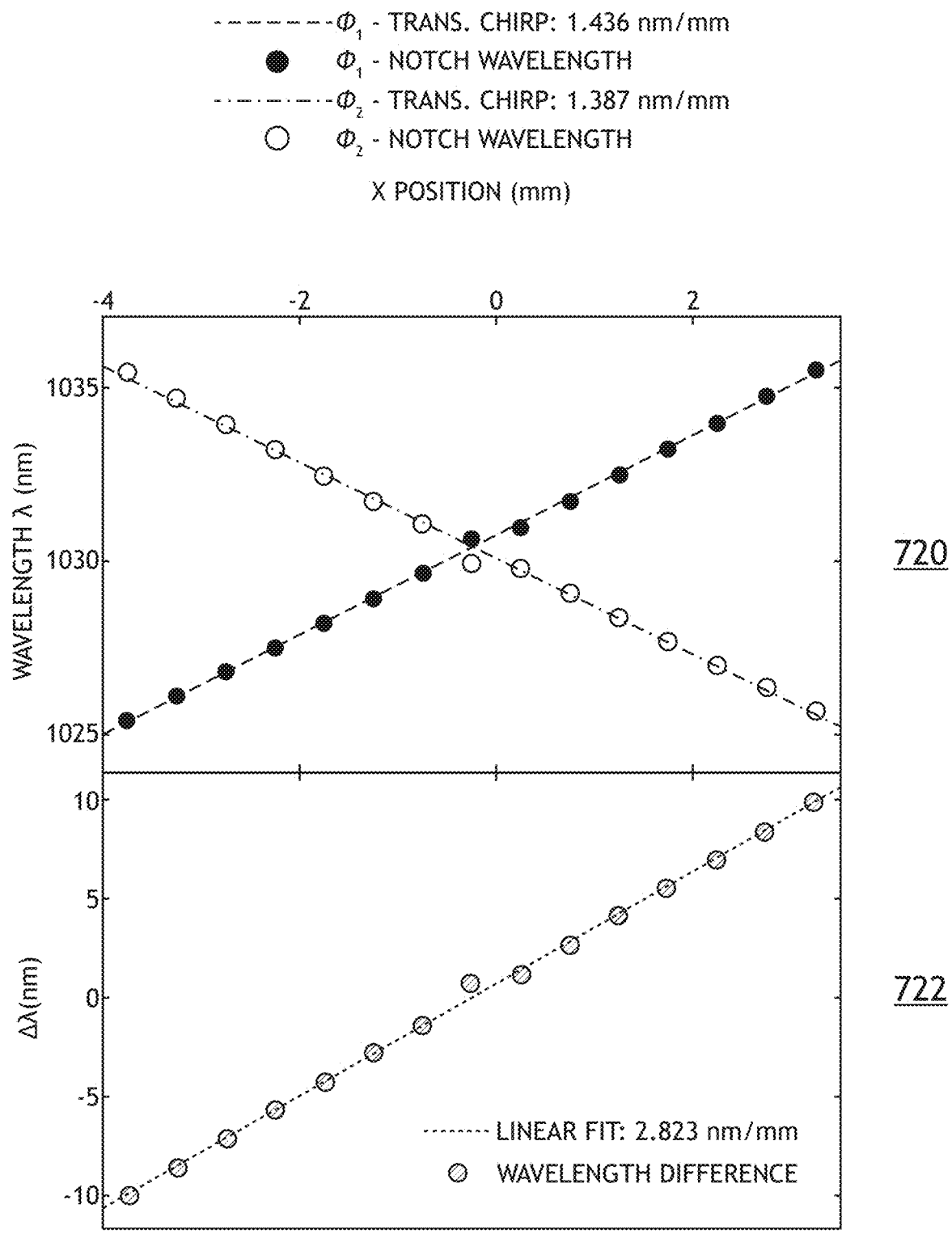
FIG. 7E is a plot illustrating spectral properties of a PS-LCVBG with an X-shaped distribution of longitudinal $\pi$ phase shifts as depicted in FIGS. 3D-3F and 5A-5B, in accordance with one or more embodiments of the present disclosure.

FIG. 7E is a plot illustrating spectral properties of a PS-LCVBG 102 with an X-shaped distribution of longitudinal π phase shifts as depicted in FIGS. 3D-3F and 5A-5B, in accordance with one or more embodiments of the present disclosure. The top panel 720 is a plot of the center wavelengths associated with an output laser beam 708 as a function of transverse position (here position along the X direction). The bottom panel 722 is a plot of the wavelength difference of the center wavelengths as a function of transverse position. As illustrated in FIG. 7E, the systems and methods disclosed herein enable precise tuning of center wavelengths of coherent light in an output laser beam 708 and thus precise tuning of the spectral content of a modified output beam 724 generated based on nonlinear combinations of this light. Further, as described previously herein, the center wavelengths of coherent light in an output laser beam 708 and thus the wavelength of the modified output beam 724 may be continuously tuned without mode-hopping.

It is to be understood that FIG. 7E and the associated description are also provided solely for illustrative purposes and are not limiting. In general, an emission source 700 with a PS-LCVBG 102 as disclosed herein may provide coherent light at any number of center wavelengths and may further provide tuning of these center wavelengths as a function of transverse position based on any design of longitudinal phase shifts throughout the volume of the PS-LCVBG 102. As one illustration, a PS-LCVBG 102 including a V-shaped distribution of longitudinal π phase shifts as depicted in FIGS. 3G-3H and 6A-6B may provide similar tunability as shown in FIG. 7E.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A phase-shifted longitudinally-chirped volume Bragg grating (PS-LCVBG) comprising:
   a solid block of photosensitive material having a planar input face, wherein the photosensitive material includes a VBG formed as a periodic volumetric refractive index distribution characterized by a grating vector direction, wherein a period of the VBG is longitudinally chirped to vary linearly along the grating vector direction, wherein the VBG further includes a spatially-varying distribution of longitudinal phase shifts providing a spatially-varying distribution of reflectivity in a transverse plane normal to the grating vector direction, wherein light incident on the planar input face is at least partially reflected based on the spatially-varying distribution of reflectivity.

2. The PS-LCVBG of claim 1, wherein the grating vector direction is normal to the planar input face.

3. The PS-LCVBG of claim 1, wherein the grating vector direction is at an oblique angle relative to the planar input face.

4. The PS-LCVBG of claim 1, wherein the spatially-varying distribution of longitudinal phase shifts of the VBG comprises longitudinal π phase shifts at selected locations in the transverse plane and depths along the grating vector direction.

5. The PS-LCVBG of claim 1, wherein the spatially-varying distribution of the reflectivity in a transverse plane comprises:
   one or more reflectivity notches, wherein at least one of the one or more reflectivity notches has a center wavelength that continuously varies as a function of position in the transverse plane.

6. The PS-LCVBG of claim 5, wherein the center wavelength of the at least one of the one or more reflectivity notches varies monotonically as the function of position in the transverse plane.

7. The PS-LCVBG of claim 5, wherein the center wavelength of the at least one of the one or more reflectivity notches varies linearly as the function of position in the transverse plane.

8. The PS-LCVBG of claim 5, wherein the center wavelength of the at least one of the one or more reflectivity notches varies quadratically as the function of position in the transverse plane.

9. The PS-LCVBG of claim 5, wherein the center wavelength of the at least one of the one or more reflectivity notches decreases linearly along a selected direction in the transverse plane for a first range of positions in the transverse plane and increases linearly along the selected direction in the transverse plane for a second range of positions in the transverse plane.

10. The PS-LCVBG of claim 5, wherein the spatially-varying distribution of the reflectivity in a transverse plane includes at least a region with two reflectivity notches, wherein the center wavelengths of a first of the two reflectivity notches monotonically increases along a selected direction in the transverse plane, wherein the center wavelength of a second of the two reflectivity notches monotonically decreases along the selected direction in the transverse plane.

11. The PS-LCVBG of claim 1, wherein the photosensitive material comprises:
    photo-thermo-refractive (PTR) glass.

12. An emission source comprising:
    a phase-shifted longitudinally-chirped volume Bragg grating (PS-LCVBG) comprising a solid block of photo-luminescent photosensitive material having two parallel planar faces, wherein the photo-luminescent photosensitive material includes a VBG formed as a periodic volumetric refractive index distribution characterized by a grating vector direction, wherein the grating vector direction is normal to the planar faces, wherein a period of the VBG is longitudinally chirped to vary linearly along the grating vector direction, wherein the VBG further includes a spatially-varying distribution of longitudinal phase shifts providing a spatially-varying distribution of reflectivity in a transverse plane normal to the grating vector direction, wherein the spatially-varying distribution of the reflectivity in a transverse plane includes one or more reflectivity notches with tunable center wavelengths as a function of position in the transverse plane;
    a pump source configured to generate pump light; and
    one or more input lenses configured to direct the pump light into the PS-LCVBG, wherein the PS-LCVBG emits coherent light at the center wavelengths, wherein the center wavelengths are tunable by adjusting a relative position of the pump light within the transverse plane.

13. The emission source of claim 12, wherein the spatially-varying distribution of the reflectivity in the transverse plane includes a single reflectivity notch, wherein the center wavelength of the single reflectivity notch is tunable as the function of position in the transverse plane.

14. The emission source of claim 13, wherein the center wavelength varies continuously as the function of position in the transverse plane.

15. The emission source of claim 13, wherein the center wavelength varies monotonically as the function of position in the transverse plane.

16. The emission source of claim 13, wherein the center wavelength varies linearly as the function of position in the transverse plane.

17. The emission source of claim 13, wherein the center wavelength varies quadratically as the function of position in the transverse plane.

18. The emission source of claim 12, wherein the spatially-varying distribution of the reflectivity in the transverse plane includes two reflectivity notches, wherein the center wavelengths of the two reflectivity notches are tunable as the function of position in the transverse plane.

19. The emission source of claim 18, further comprising:
    a nonlinear optical material configured to generate output light based on the light from the PS-LCVBG with the two center wavelengths using a non-linear mixing process.

20. The emission source of claim 19, wherein the non-linear mixing process comprises:
    at least one of a difference frequency generation process or a four-wave mixing process.

21. The emission source of claim 19, wherein the output light has an optical frequency greater than 1 GHz.

22. The emission source of claim 19, wherein the output light has an optical frequency greater than 1 THz.

23. The emission source of claim 18, wherein the center wavelength of a first of the two reflectivity notches monotonically increases along a selected direction in the transverse plane, wherein the center wavelength of a second of the two reflectivity notches monotonically decreases along the selected direction in the transverse plane.

24. The emission source of claim 12, wherein the spatially-varying distribution of longitudinal phase shifts of the VBG comprises longitudinal $\pi$ phase shifts at selected locations in the transverse plane and depths along the grating vector direction.

* * * * *